(12) United States Patent
Alerigi et al.

(10) Patent No.: US 10,558,105 B2
(45) Date of Patent: *Feb. 11, 2020

(54) DIRECTIONAL SENSITIVE FIBER OPTIC CABLE WELLBORE SYSTEM

(71) Applicant: Saudi Arabian Oil Company, Dhahran (SA)

(72) Inventors: Damian Pablo San Roman Alerigi, Dhahran (SA); Frode Hveding, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/436,268

(22) Filed: Jun. 10, 2019

(65) Prior Publication Data

US 2019/0294022 A1    Sep. 26, 2019

Related U.S. Application Data

(63) Continuation of application No. 15/864,284, filed on Jan. 8, 2018, now Pat. No. 10,365,537.

(51) Int. Cl.
| G02F 1/125 | (2006.01) |
| G02F 1/313 | (2006.01) |
| G01D 5/353 | (2006.01) |
| G01V 8/16 | (2006.01) |
| G01L 1/24 | (2006.01) |

(Continued)

(52) U.S. Cl.
CPC ......... *G02F 1/3134* (2013.01); *G01D 5/3538* (2013.01); *G01H 9/006* (2013.01); *G01L 1/242* (2013.01); *G01V 1/208* (2013.01); *G01V 1/52* (2013.01); *G01V 8/16* (2013.01); *G02B 6/02104* (2013.01); *G02F 1/125* (2013.01)

(58) Field of Classification Search
CPC ..................................................... G02F 1/3134
USPC ............................................................. 385/30
See application file for complete search history.

(56) References Cited

U.S. PATENT DOCUMENTS

| 3,735,336 A | 5/1973 | Long |
| 4,462,699 A | 7/1984 | Herbert et al. |

(Continued)

FOREIGN PATENT DOCUMENTS

| CN | 103591927 A | 2/2014 |
| GB | 2230109 | 10/1990 |

(Continued)

OTHER PUBLICATIONS

International Search Report and Written Opinion issued in International Application No. PCT/US2018/067791 dated Mar. 20, 2019, 19 pages.

(Continued)

*Primary Examiner* — Qutbuddin Ghulamali
(74) *Attorney, Agent, or Firm* — Fish & Richardson P.C.

(57) ABSTRACT

A fiber optic cable assembly includes an elongate housing, a signal fiber placed inside the housing and extending longitudinally, and a plurality of sensing fibers placed inside the housing and extending longitudinally. The plurality of sensing fibers is placed around the signal fiber. Each of the plurality of sensing fibers carries a respective laser signal of a distinct frequency. The signal fiber carries one or more evanescent coupling signals responsive to the laser signals in the plurality of sensing fibers.

6 Claims, 19 Drawing Sheets

(51) Int. Cl.
*G01H 9/00* (2006.01)
*G01V 1/52* (2006.01)
*G02B 6/02* (2006.01)
*G01V 1/20* (2006.01)

(56) References Cited

U.S. PATENT DOCUMENTS

| | | | | |
|---|---|---|---|---|
| 4,701,015 | A * | 10/1987 | Saito | G02B 6/4427 |
| | | | | 385/109 |
| 4,717,253 | A | 1/1988 | Pratt | |
| 4,756,627 | A | 7/1988 | Nelson | |
| 5,013,126 | A * | 5/1991 | Hattori | G02B 6/4408 |
| | | | | 385/103 |
| 7,024,081 | B2 * | 4/2006 | Dowd | G02B 6/4492 |
| | | | | 166/351 |
| 7,668,419 | B2 * | 2/2010 | Taverner | G01K 11/00 |
| | | | | 385/12 |
| 9,075,155 | B2 * | 7/2015 | Luscombe | G01V 1/48 |
| 9,080,949 | B2 | 7/2015 | Mestayer et al. | |
| 9,255,836 | B2 * | 2/2016 | Taverner | G01H 9/004 |
| 9,546,548 | B2 * | 1/2017 | Hartog | E21B 47/101 |
| 2009/0296778 | A1 | 12/2009 | Kinugasa et al. | |
| 2010/0296100 | A1 | 11/2010 | Blacklaw | |
| 2014/0199017 | A1 | 7/2014 | Den Boer et al. | |
| 2015/0355015 | A1 | 12/2015 | Crickmore et al. | |
| 2016/0223389 | A1 | 8/2016 | Farhadiroushan et al. | |
| 2017/0260847 | A1 | 9/2017 | Xia et al. | |

FOREIGN PATENT DOCUMENTS

| | | |
|---|---|---|
| WO | WO2012136951 | 10/2012 |
| WO | WO2014201313 A1 | 12/2014 |
| WO | WO2016148687 | 9/2016 |
| WO | WO2018222541 | 12/2018 |

OTHER PUBLICATIONS

International Search Report and Written Opinion issued in International Application No. PCT/US2018/067795 dated Apr. 3, 2019, 13 pages.

Ghatak and Thyagarajan, "An introduction to Fiber Optics," Cambridge University Press, 1st Ed., Jun. 28, 1998, 6 pages.

Hveding et al., "Integrated Applications of Fiber-Optic Distributed Acoustic and Temperature Sensing," SPE Lating American and Caribbean Petroleum Engineering Conference, Nov. 20, 2015, 16 pages.

* cited by examiner

DIRECTIONAL SENSITIVE FIBER OPTIC CABLE WELLBORE SYSTEM

CLAIM OF PRIORITY

This application claims priority to and is a continuation of U.S. patent application Ser. No. 15/864,284, filed on Jan. 8, 2018, the entire contents of which is hereby incorporated by reference.

TECHNICAL FIELD

This disclosure relates to a fiber optic cable system used in a wellbore.

BACKGROUND

Fiber optic cables are used today for downhole sensing in a wellbore. For example, distributed acoustic sensing (DAS) systems and distributed temperature sensing (DTS) systems use fiber optic cables to measure temperatures and detect acoustic frequency strain signals in the wellbore, respectively.

SUMMARY

This disclosure relates to a directional sensitive fiber optic cable wellbore system.

In an implementation, a fiber optic cable assembly includes an elongate housing, a signal fiber placed inside the housing and extending longitudinally, and a plurality of sensing fibers placed inside the housing and extending longitudinally. The plurality of sensing fibers is placed around the signal fiber. Each of the plurality of sensing fibers carries a respective laser signal of a distinct frequency. The signal fiber carries one or more evanescent coupling signals responsive to the laser signals in the plurality of sensing fibers.

The details of one or more implementations of the subject matter described in this disclosure are set forth in the accompanying drawings and the description later. Other features, aspects, and advantages of the subject matter will become apparent from the description, the drawings, and the claims.

DETAILED DESCRIPTION

Figure 1:
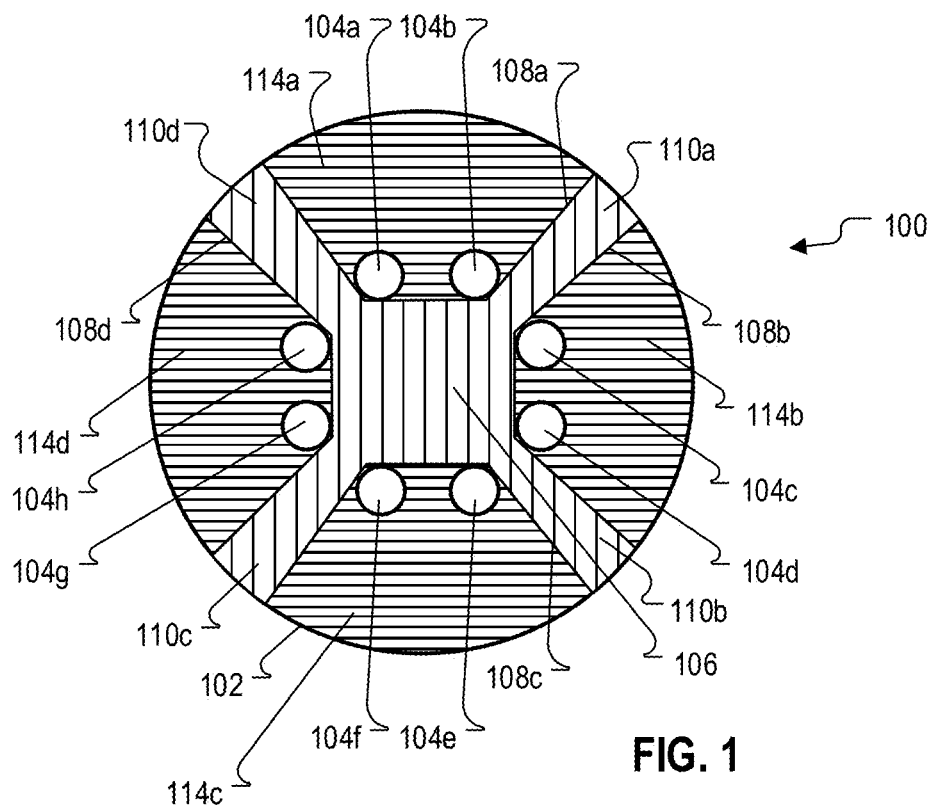
FIG. 1 illustrates a first cross section of a schematic of an example directional sensitive fiber optic cable assembly for a first implementation of a directional sensitive fiber optic cable system, according to some implementations.

Fiber optic cables with laser signals can be used for downhole sensing to collect data along a wellbore. For example, a distributed acoustic sensing (DAS) system can use fiber optic cables connected to a laser box to detect acoustic frequency strain signals in the wellbore. A laser source or a laser transmitter in the laser box can send short laser pulses into a fiber. When light of the laser pulses travels towards the end of the fiber, the light interacts with crystal molecules inside the fiber and part of the light is scattered back to be detected by a detector or a receiver in the laser box. The detected light can be analyzed to determine characteristics of the sound waves affecting the fiber.

However, fiber optic cables are, by nature, not able to sense a direction of an external force, because the fiber is affected by a surrounding environment without being able to detect the direction of the source. For instance, if a fiber optic cable of a DAS is affected by a sound wave from a seismic source, the DAS cannot determine whether the sound recorded is coming from above (for example, signals directly from the seismic source) or from a reflection point below or from the side (for example, signals reflected by earth subsurface layers below). In other words, the fibers are affected by sources from every direction and not directional sensitive.

This disclosure describes a directional sensitive fiber optic cable system for downhole sensing. In other words, the described fiber optic cable system enables directional sensitivity and can isolate external forces (such as acoustic waves) or sense environmental variations (such as pressure, strain-stress, or temperature changes) from different directions.

A first implementation of the fiber optic cable system is based on sound isolation. As illustrated later in FIGS. 1-8, the first implementation includes a first fiber optic cable assembly including acoustic isolating material that acoustically isolates multiple fiber optic cables (or fibers) into different sections, each section facing a direction (for example, east, south, west, north, up, down, left, or right). The fiber optic cable(s) positioned in different sections can detect sound waves received in individual sections so that sound waves coming from different directions associated with the sections can be isolated. To improve sound detectability and directional sensitivity, each section also includes an acoustic reflective surface to amplify sound waves received in the section. The acoustic reflective surface can also have a curved shape so that the sound waves are reflected towards the fiber optic cable(s) in the section. Laser signals are sent to the multiple fiber optic cables, and the sound directions can be determined based on the returned laser signals.

A second implementation of the fiber optic cable system is based on evanescent electromagnetic (EM) coupling. As illustrated later in FIGS. 10-16, the second implementation includes a second fiber optic cable assembly including a signal fiber and multiple sensing fibers placed around the signal fiber. Acoustic or pressure mirrors can be used to separate the multiple sensing fibers into different sections facing different directions. Laser signals are transmitted to the sensing fibers, where each sensing fiber carries a laser signal and each laser signal has a different frequency than other laser signals. Environmental variations can change a refractive index of a sensing fiber, reduce a distance between the sensing fiber and the signal fiber, or both. When the distance between the sensing fiber and the signal fiber is less than a threshold, and the sensing fiber and the signal fiber have similar refractive indexes, evanescent coupling occurs where signal energy transfers from the sensing fiber to the signal fiber. The directions, amplitudes, or frequencies of the environmental variations or acoustic waves can be determined based on the signal frequencies and amplitudes of the evanescent coupling signals received in the signal fiber and the signal intensity changes in the sensing fibers.

In some implementations, the described fiber optic cable assemblies can be strapped outside a tubing (or a casing) and lowered into a wellbore with the tubing, where, for example, a first section is facing the tubing and a second section is facing away from the tubing. The fiber(s) in the first section can sense sound waves or environmental variations caused by a tubing flow (that is, a fluid flowing through the tubing), and the detected signals from the first section can be used to determine characteristics of the tubing fluid. Similarly, the fiber(s) in the second section can sense sound waves or environmental variations caused by a compartment fluid (that is, a fluid flowing through an annulus between a formation and the tubing), and the detected signals from the second section can be used to determine characteristics of the compartment fluid. In this disclosure, a fluid is flowing media, which can be a one-phase flow or a multiphase flow.

In some implementations, as described later in FIG. 17, the described fiber optic cable system also includes a fiber optic gyro for determining an amount of tubing rotation that occurs when the tubing is running downhole. Based on the amount of tubing rotation, an orientation of the fiber optic cable assembly in the wellbore can be determined and the direction of each section can also be determined. The fiber optic gyro can be wrapped around the tubing and lowered into the wellbore with the tubing.

In some implementations, the described fiber optic cable system can connect to one or more computers or processors to process received signals from the fiber optic cable assembly or the fiber optic gyro or both. The one or more computers or processors can also include a computer-readable medium (for example, a non-transitory computer-readable medium) including instructions which, when executed, cause the one or more computers or processors to perform operations of processing signals from the fiber optic cable assembly or the fiber optic gyro or both as described in this disclosure.

In sum, the described fiber optic cable system can sense environmental variations from different directions. The described fiber optic cable system can be used in various scenarios. For example, as described earlier and illustrated later in FIGS. 18-19, the fiber optic cable system can be used to separate a compartment flow and a tubing flow. The fiber optic cable system can also be used for seismic applications to separate down-going sound waves (for example, sound waves directly from a seismic source at an earth surface) and up-going sound waves (for example, sound waves reflected by earth subsurface layers), as illustrated later in FIGS. 20-21.

The first implementation of the directional sensitive fiber optic cable system based on sound isolation FIG. 1 illustrates a first cross section of a schematic of an example directional sensitive fiber optic cable assembly 100 for a first implementation of a directional sensitive fiber optic cable system, according to some implementations. The example fiber optic cable assembly 100 includes an elongate housing 102, multiple fiber optic cables (or fibers) 104a-104h placed inside the housing 102 and extending longitudinally along the housing, and acoustic isolating material 106 placed inside the housing 102 and extending longitudinally along the housing. The acoustic isolating material 106 is formed to include multiple outwardly radially extending arms 110a-110d extending from a center of the housing 102 towards a circumference of the housing 102. The multiple arms can divide a space inside the housing 102 (for example, evenly or unevenly divide the space) into multiple acoustically isolated sections (for example, four sections 114a-114d). The fiber optic cable assembly 100 can have N acoustically isolated sections, where N is an integer number greater than one. Each acoustically isolated section extends longitudinally, and includes at least one fiber optic cable. Each acoustically isolated section is acoustically insulated from remaining sections of the multiple acoustically isolated sections due to the arm separating two adjacent sections. The acoustically isolated sections 114a-114d can have acoustic reflecting surfaces 108a-108d.

For example, the acoustic isolating material 106 can be a star shape, filling the vertical crosshatching area in FIG. 1 and including four arms 110a-110d to evenly divide the space inside the housing 102 into four sections 114a-114d. Each section can have two fiber optic cables (for example, one cable for measuring temperature and one cable for detecting sound waves). The fiber optic cables placed in different sections are isolated from each other. For example, the fiber optic cables 104a-104b in section 114a are isolated from the fiber optic cables 104c-104d in section 114b. In some implementations, the fiber optic cable assembly 100 can have less than or more than four arms, and each section can have less than or more than two fiber optic cables.

For enhancing sound directional sensitivity, the acoustic reflecting surfaces 108a-108d can use a hard (or high density) and acoustic reflective material so that sound waves can be reflected. For example, the acoustic reflecting surfaces 108a-108d can be made of polyether ether ketone (PEEK) or other types of material. The acoustic reflecting surfaces can be made by injection molding or other methods consistent with this disclosure. To further enhance reflection and improve signal directional sensitivity, the acoustic reflecting surfaces 108a-108d can have a shape that can reflect sound waves received in each section towards the fiber optic cables within the section so that the fiber optic cables can receive more sound energy. For example, the acoustic reflecting surfaces 108a-108d can have a curved shape, such as a conical shape or a C-shape.

The acoustic isolating material 106 can reduce or prevent sound waves received in one section from penetrating into another section. When sound waves reach the acoustic reflecting surfaces 108a-108d, a portion of the waves undergoes reflection and a portion of the waves undergoes transmission across the acoustic reflecting surfaces 108a-108d. The sound wave that passes through the reflective surfaces 108a-108d can be further reduced by the acoustic isolating material 106. The acoustic isolating material 106 can be a soft material that can absorb sound. For example, the acoustic isolating material 106 can be a composite material such as a mix of High Density Poly Ethylene (HDPE) with a Styrene Butadiene Rubber (SBR) or other types of material consistent with this disclosure. The materials of the acoustic reflecting surfaces 108a-108d and the acoustic isolating material 106 can be strong and light, and at the same time can survive and function at temperatures up to, for example, 120-150° C. without breaking or melting.

In some implementations, the housing 102 can have a circular cross-section, and be made of, for example, a metal, a composite material (with carbon fiber or PEEK), or other material that does not affect sound penetrating from outside to inside of the housing 102. The housing 102 can be strong and light, and protect the fiber optic cables 104a-104h from damaging and degradation. In some implementations, the fiber optic cables 104a-104h can be optical fibers without protective cable tubes.

The fiber optic cable assembly 100 can also include a gel in each acoustically isolated section to fill the void between the arms 110a-110d, for example, filling the horizontal crosshatching areas in FIG. 1. The gels keep the fiber optic cables 104a-104h immobilized and protect the fiber optic cables 104a-104h from external forces. The gels can be a hydrophobic gel for preventing or reducing possible hydrogen darkening or other types of gel consistent with this disclosure. In some implementations, the gels can be optional.

Figure 2:
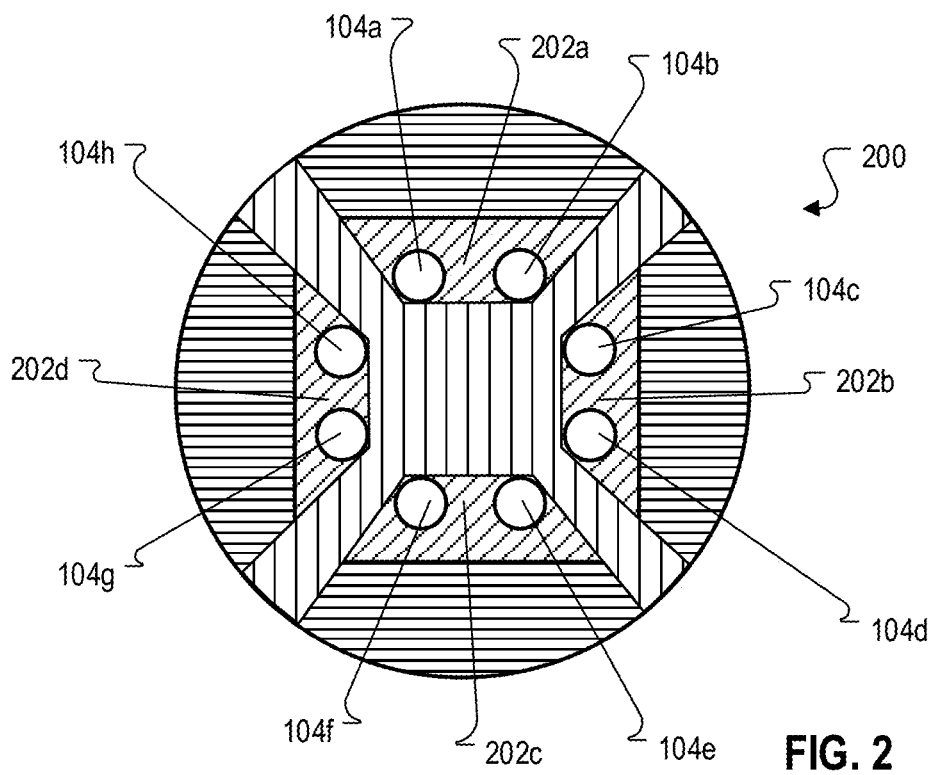
FIG. 2 illustrates a second cross section of a schematic of an example directional sensitive fiber optic cable assembly for a first implementation of a directional sensitive fiber optic cable system, according to some implementations.

FIG. 2 illustrates a second cross section of a schematic of an example directional sensitive fiber optic cable assembly 200 for a first implementation of a directional sensitive fiber optic cable system, according to some implementations. The fiber optic cable assembly 200 is substantially similar to (for example, the same as) the fiber optic cable assembly 100 in FIG. 1 except that the fiber optic cable assembly 200 has additional isolating material 202a-202d that further protects the fiber optic cables 104a-104h beyond gels. For example, as shown in FIG. 2, the additional isolating material 202a-202d can fill the diagonal crosshatching areas around the fiber optic cables 104a-104h, and gels can fill the remaining horizontal crosshatching areas in the acoustically isolated sections.

Figure 3:
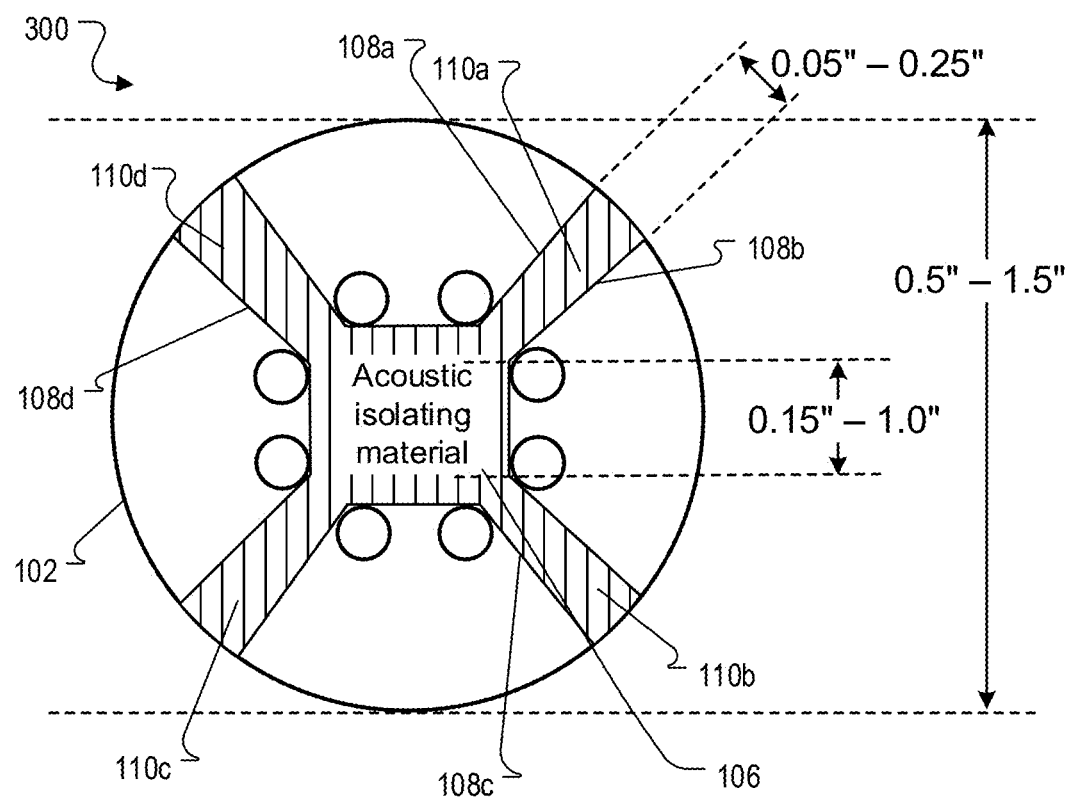
FIG. 3 illustrates an example physical dimension of a schematic of a directional sensitive fiber optic cable assembly for a first implementation of a directional sensitive fiber optic cable system, according to some implementations.

FIG. 3 illustrates an example physical dimension of a schematic of a directional sensitive fiber optic cable assembly 300 for a first implementation of a directional sensitive fiber optic cable system, according to some implementations. For example, the housing 102 can have a diameter of 0.5-1.5 inches. The center of the acoustic isolating material 106 can have a square shape with each side having a length of 0.15-1.0 inches. The arms 110a-110d can have a thickness of 0.05-0.25 inches. For example, since the acoustic reflecting surfaces 108a-108d can have a curved shape, portions of the arms 110a-110d towards the center of the acoustic isolating material can have a thickness of 0.05 inches, while portions of the arms 110a-110d towards the housing 102 can be thicker and have a thickness of 0.25 inches. The dimensions are examples only; other dimensions are possible and can depend on the specific application for which the assembly 300 is being developed.

Figure 4A:
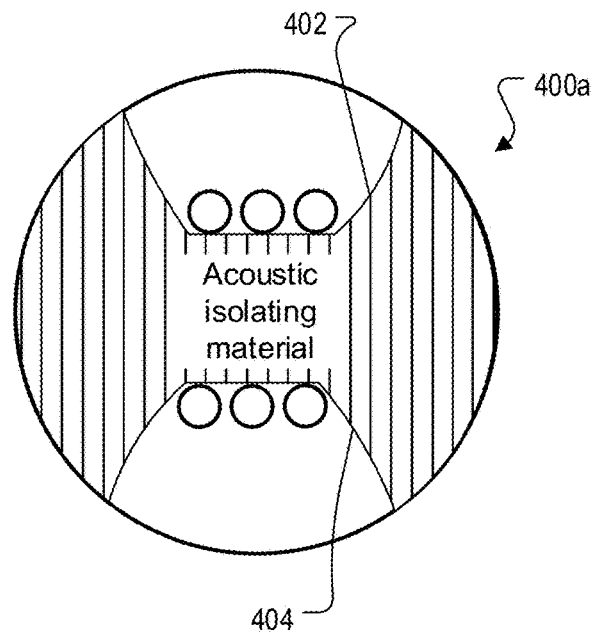
FIGS. 4A-4C illustrate cross sections of schematics of example directional sensitive fiber optic cable assemblies having two acoustically isolated sections for a first implementation of a directional sensitive fiber optic cable system, according to some implementations.
Figure 4B:
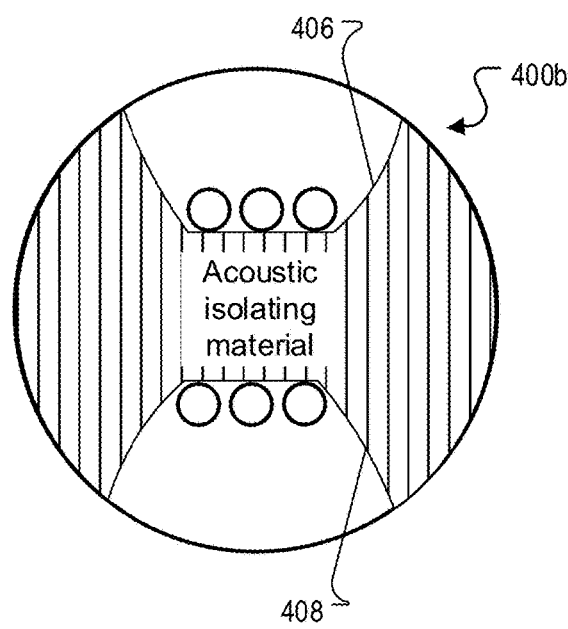
Figure 4C:
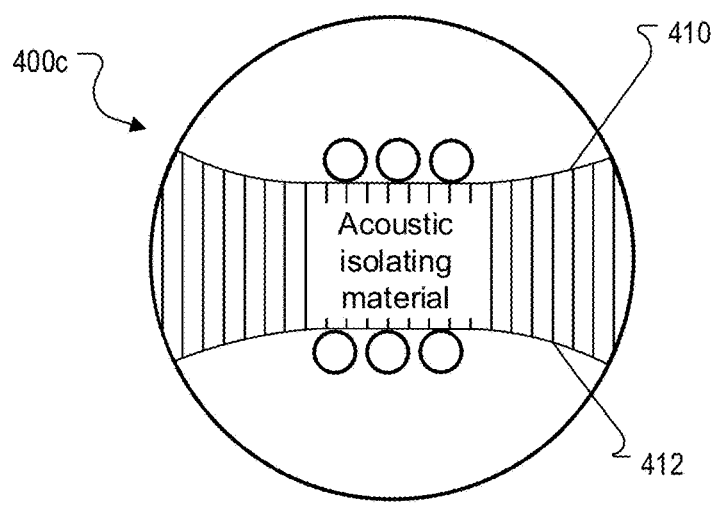

FIGS. 4A-4C illustrate cross sections of schematics of example directional sensitive fiber optic cable assemblies 400a, 400b, and 400c having two acoustically isolated sections for a first implementation of a directional sensitive fiber optic cable system, according to some implementations. The fiber optic cable assemblies 400a, 400b, and 400c can have three fiber optic cables in each acoustically isolated section. The acoustic reflecting surfaces 402, 404, 406, 408, 410, and 412 have different curved shapes, where the acoustic reflecting surfaces 402 and 404 in FIG. 4A are most curved and the acoustic reflecting surfaces 410 and 412 in FIG. 4C are least curved. In some cases, the reflecting surfaces 402 and 404 can reflect more sound waves towards the fibers than the reflecting surfaces 410 and 412 can.

Figure 5:
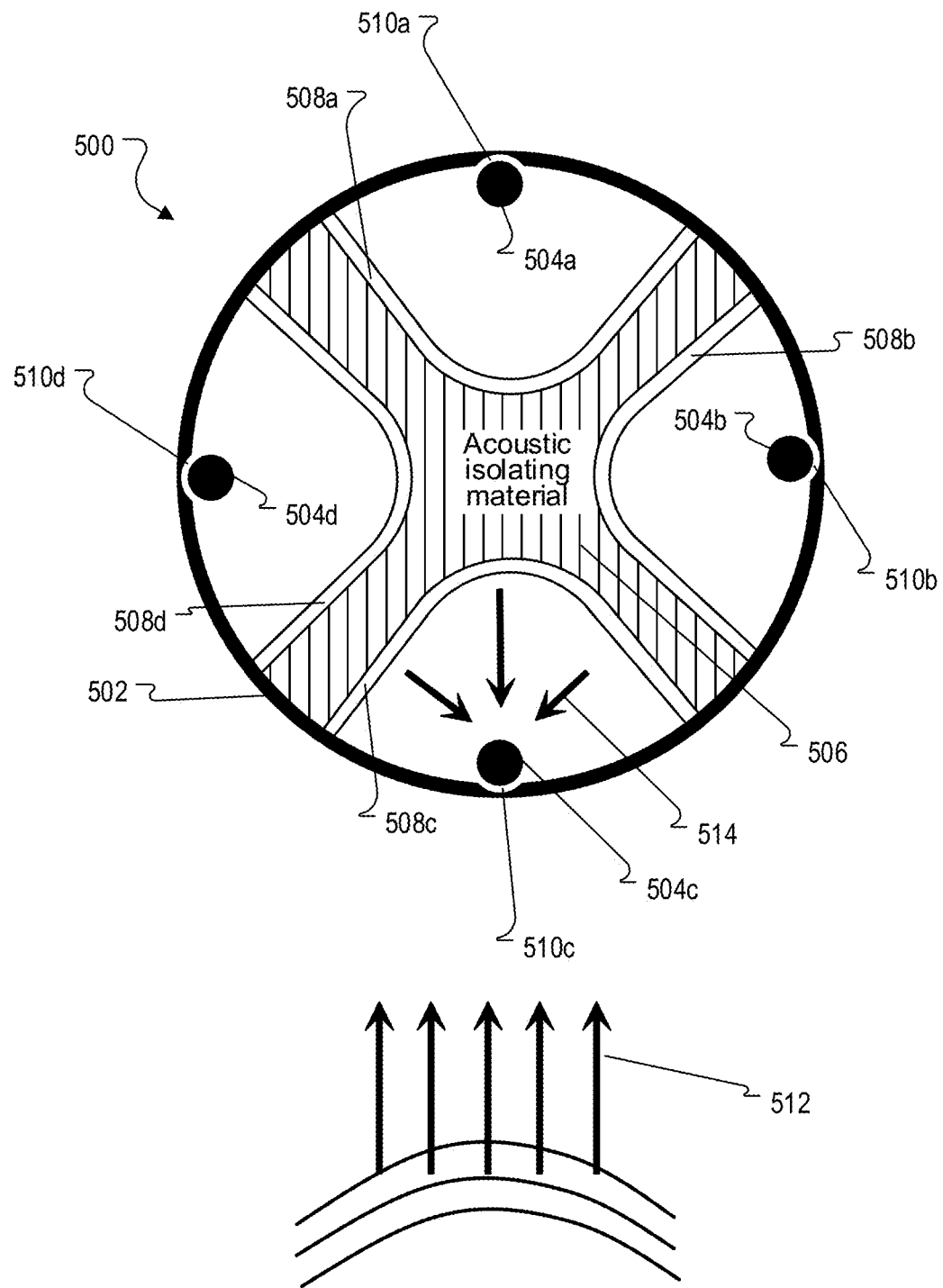
FIG. 5 illustrates a third cross section of a schematic of an example directional sensitive fiber optic cable assembly for a first implementation of a directional sensitive fiber optic cable system, according to some implementations.

FIG. 5 illustrates a third cross section of a schematic of an example directional sensitive fiber optic cable assembly 500 for a first implementation of a directional sensitive fiber optic cable system, according to some implementations. The fiber optic cable assembly 500 includes a housing 502, and acoustic isolating material 506 dividing a space inside the housing 502 into four acoustically isolated sections. Each section has one fiber optic cable. In some implementations, each section can have more than one fiber optic cable. The four fiber optic cables 504a-504d are grooved in an inner surface of the housing 502 through grooves 510a-510d. For example, the fiber optic cables 504a-504d can be grooved at a center of the housing portion of each section. In some implementations, the housing 502 can have a thickness that can at least accommodate the grooves 510a-510d. The acoustic reflecting surfaces 508a-508d of the four acoustically isolated sections can have a parabola-shape such that, for example, reflected sound waves 514 caused by incoming sound waves 512 can be focused towards the fiber optic cable 504c to enhance signal directional sensitivity. When incoming sound waves 512 hit the parabola-shaped surface 508c, the surface 508c can reflect the sound waves 514 towards a focal point where the fiber optic cable 504c is located.

Figure 6:
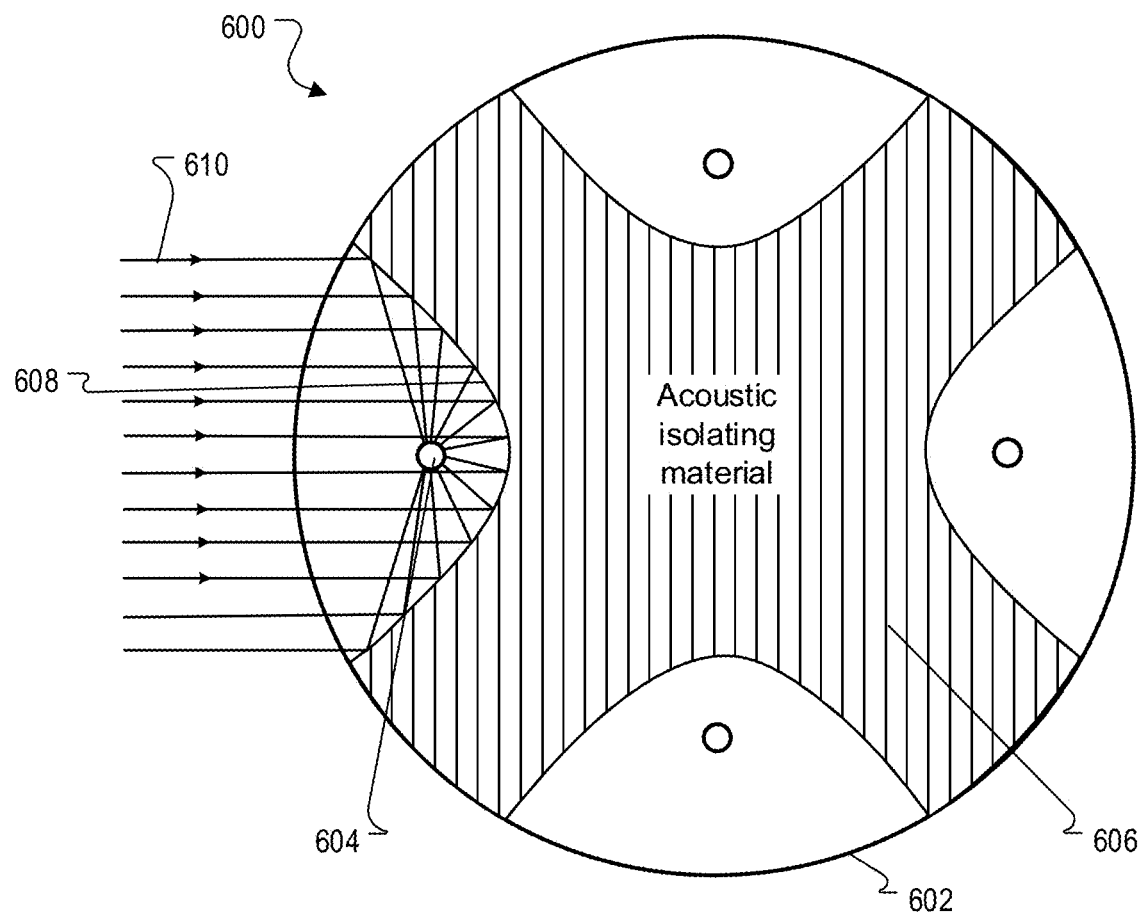
FIG. 6 illustrates a fourth cross section of a schematic of an example directional sensitive fiber optic cable assembly for a first implementation of a directional sensitive fiber optic cable system, according to some implementations.

FIG. 6 illustrates a fourth cross section of a schematic of an example directional sensitive fiber optic cable assembly 600 for a first implementation of a directional sensitive fiber optic cable system, according to some implementations. The fiber optic cable assembly 600 includes a housing 602, and acoustic isolating material 606 dividing a space inside the housing 602 into four acoustically isolated sections. Each section has one fiber optic cable located at a center of the section and a parabola-shaped acoustic reflecting surface. For example, when sound waves 610 reflect off the parabola-shaped surface 608, the sound waves 610 bounce out in straight lines, no matter where the sound waves 610 hit the parabola-shaped surface 608, to a focal point where the fiber optic cable 604 locates.

Figure 7:
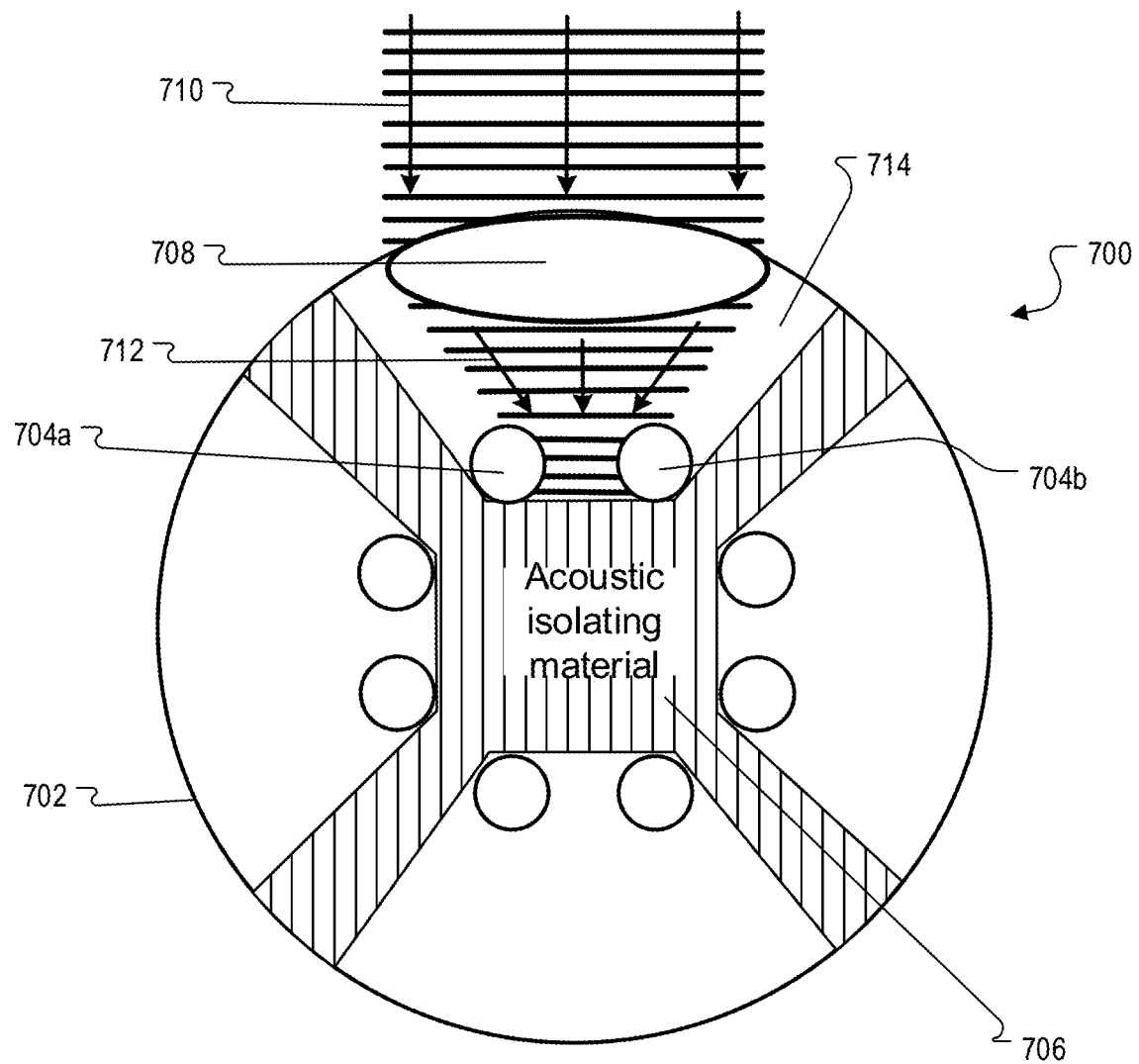
FIG. 7 illustrates a fifth cross section of a schematic of an example directional sensitive fiber optic cable assembly for a first implementation of a directional sensitive fiber optic cable system, according to some implementations.

FIG. 7 illustrates a fifth cross section of a schematic of an example directional sensitive fiber optic cable assembly 700 for a first implementation of a directional sensitive fiber optic cable system, according to some implementations. The fiber optic cable assembly 700 includes a housing 702, and acoustic isolating material 706 dividing a space inside the housing 702 into four acoustically isolated sections. Each section can have two fiber optic cables and an acoustic lens to focus sound waves towards the fiber optic cables. For example, two fiber optic cables 704a-704b and an acoustic lens 708 can be placed in the acoustically isolated section 714. The acoustic lens 708 can be located at a center of an inner surface of the housing portion associated with the section 714. When incoming sound waves 710 pass through the lens 708, the passed sound waves 712 are directed to where the fiber optic cables 704a-704b are located to enhance signal directional sensitivity.

Figure 8:
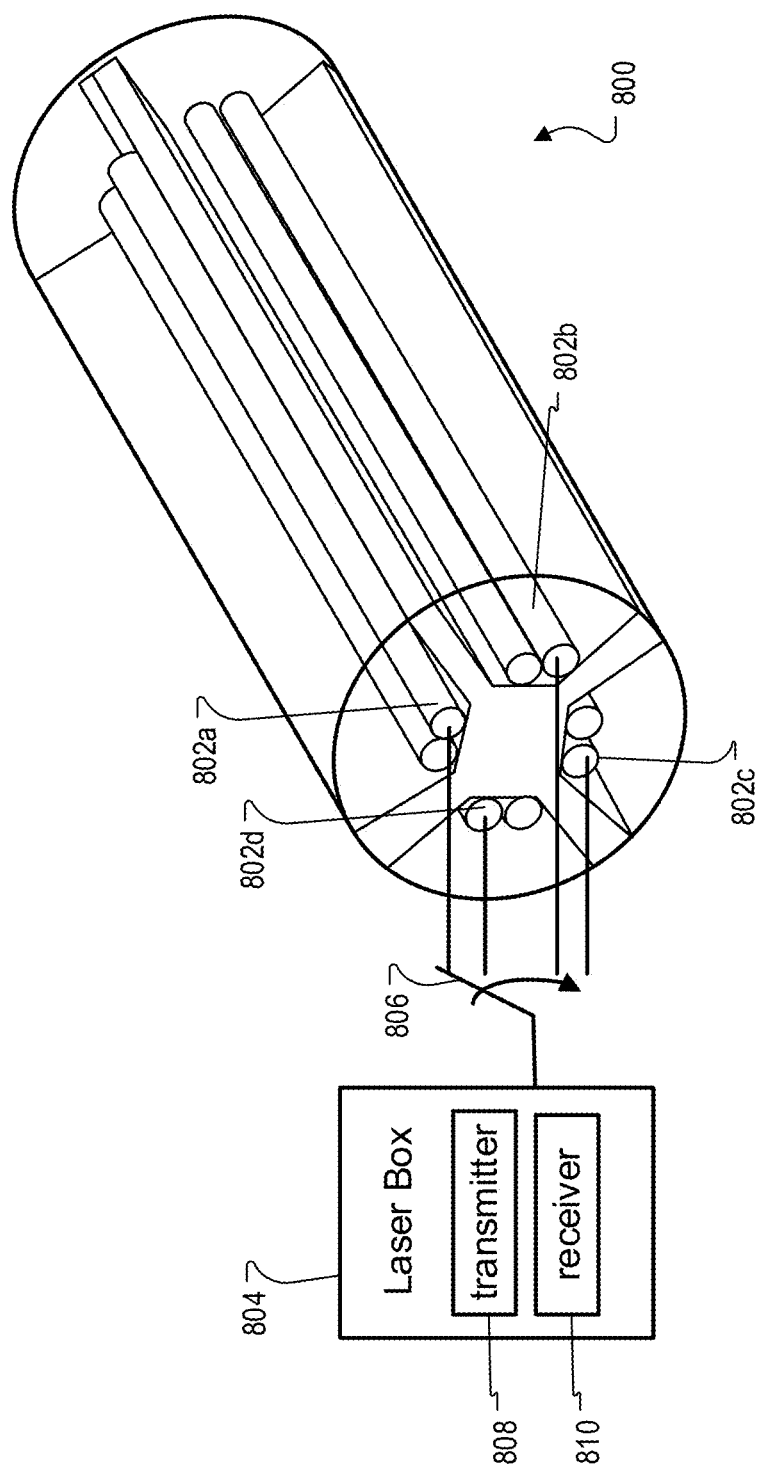
FIG. 8 illustrates a perspective view of a schematic of an example directional sensitive fiber optic cable assembly for a first implementation of a directional sensitive fiber optic cable system, according to some implementations.

FIG. 8 illustrates a perspective view of a schematic of an example directional sensitive fiber optic cable assembly 800 for a first implementation of a directional sensitive fiber optic cable system, according to some implementations. The fiber optic cable assembly 800 has four acoustically isolated sections. Each section has two fiber optic cables, for instance, one for measuring temperatures (DTS measurements) and one for sensing acoustic waves (DAS measurements). For example, fiber optic cables 802a-802d are used for acoustic sensing. In some implementations, one fiber optic cable can be used for both DTS and DAS measurements. A laser box 804 can connect to the fiber optic cables 802a-802d. The laser box 804 can include a transmitter 808 (or a laser source) and a receiver 810 (or a detector). The laser box 804 can use a multiplexer (or a switch) 806 to multiplex the fiber optic cables 802a-802d. For example, the multiplexer 806 can connect the laser box 804 to the fiber optic cables in an order of 802a, 802b, 802c, 802d, back to 802a, and so on. In some implementations, the transmitter 808 can send a first laser pulse into a first fiber optic cable, wait for the receiver 810 to receive the returned laser pulse, then send a second laser pulse in a second fiber optic cable, and so on. The returned laser pulse can result from a reflection and scattering of the transmitted laser pulse. In some implementations, the transmitter 808 can send, for instance, 10,000 pulses into a first fiber optic cable, wait for the receiver 810 to receive returned laser pulses, then send another 10,000 pulses into a second fiber optic cable, and so on. In some implementations, the laser box 804 can connect to one or more computers or processors to configure pulse transmissions at the transmitter 808, or process the returned pulses received at the receiver 810, or both, using one or more software programs. As will be understood by those of ordinary skill in the art, the laser box 804 can connect to any of the fiber optic cable assemblies in FIGS. 1-7.

Figure 9:
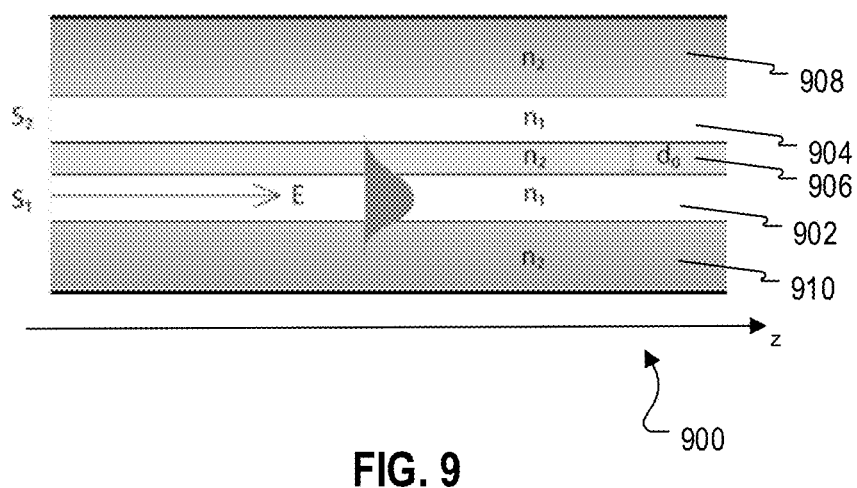
FIG. 9 illustrates evanescent electromagnetic (EM) coupling in a double-core optical fiber, according to some implementations.

The second implementation of the directional sensitive fiber optic cable system based on evanescent EM coupling In some implementations, evanescent EM coupling can be used for directional sensitivity detection. FIG. 9 illustrates evanescent EM coupling in a double-core optical fiber 900, according to some implementations. The double-core optical fiber 900 includes a first fiber core 902, a second fiber core 904, and claddings 906, 908, and 910. The fiber cores 902 and 904 are separated by the cladding 906 with a distance $d_0$. Both fiber cores 902 and 904 have a refractive index $n_1$, and the claddings 906, 908, and 910 have a refractive index $n_2$.

Evanescent EM coupling occurs when the two fiber cores 902 and 904 are brought sufficiently close (closer than a threshold as discussed later) and have similar refractive indexes. From a ray perspective, in an optical fiber the core-cladding interface sets a condition for total internal reflection. If a laser signal or beam propagates at an angle equal to or greater than a threshold angle, the signal undergoes total internal reflection and becomes confined to propagate along the core of the fiber. Yet, due to wave nature of the electromagnetic radiation, as the signal is completely reflected, some part of the signal or wave extends into the cladding and exponentially decays or evanesces. The energy flow of this evanescent signal or wave is parallel to the surface of the core and in a same direction as the main flow of energy within the core.

In other words, if the fiber cores 902 and 904 are close enough and have similar refractive indexes, when a laser signal is transmitted into one fiber core (also called input fiber core), an evanescent coupling signal or wave appears in the other fiber core (also called output fiber core). That is, the input fiber core can transfer signal energy to the output fiber core through evanescent coupling. For example, when an excitation signal of a power $P_1(0)$ is sent to the first fiber core 902, if the refractive indexes $n_1=n_2$ and the distance $$d_0 \le \frac{1}{\beta_1},$$

where $\beta_1$ is the propagation constant in the first fiber core 902 as shown in Equation (1) later, then the signal powers in the fiber cores 902 and 904, at any length z in a direction parallel to the wall of the fibers, can be expressed as $$P_1(z) = P_1(0)\left(1 - \frac{\kappa^2}{\gamma^2}\sin^2\gamma z\right), \text{ and}$$

$$P_2(z) = P_1(0)\left(\frac{\kappa^2}{\gamma^2}\sin^2\gamma z\right),$$

where $P_1(z)$ and $P_2(z)$ represent the signal powers in the first fiber core 902 and the second fiber core 904, respectively, and $P_2(z)$ is the power of the evanescent coupling signal in the second fiber core 904 responsive to the excitation signal in the first fiber core 902. The evanescent coupling also changes the signal intensity in the first fiber core 902 from $P_1(0)$ to $P_1(z)$. In addition, K is a factor that depends on the optical properties of the fiber, and y is defined as $$\gamma = \sqrt{\kappa^2 + \frac{1}{4}(\beta_1 - \beta_2)^2},$$

where $\beta_i$ is the propagation constant in the i-th fiber core defined as $$\beta_i = \frac{\omega^2}{c^2} = \frac{1}{(2\pi\lambda_i)^2}, i = 1, 2 \qquad (1)$$

where $\lambda_i$ is the wavelength of the signal in the i-th fiber core. For example, $\lambda_1$ is the wavelength of the excitation signal in the first fiber core 902.

Figure 10:
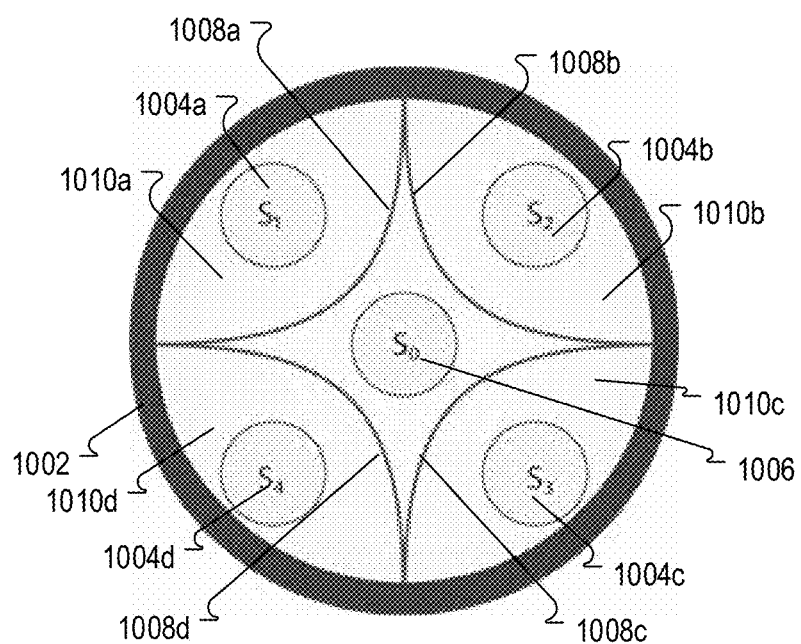
FIG. 10 illustrates a cross section of a schematic of an example directional sensitive fiber optic cable assembly for a second implementation of a directional sensitive fiber optic cable system, according to some implementations.

FIG. 10 illustrates a cross section of a schematic of an example directional sensitive fiber optic cable assembly 1000 for a second implementation of a directional sensitive fiber optic cable system, according to some implementations. The example fiber optic cable assembly 1000 includes an elongate housing 1002, sensing fibers 1004a-1004d, and a signal fiber 1006. The sensing fibers 1004a-1004d and the signal fiber 1006 are placed inside the housing 1002 and extended longitudinally along the housing 1002. The housing 1002 can have a circular cross-section. The signal fiber 1006 can be placed at the center of the housing 1002, while the sensing fibers 1004a-1004d are placed around the signal fiber 1006. For example, the sensing fibers 1004a-1004d can be arranged equidistantly on a circle around the signal fiber 1006. Although FIG. 10 shows four sensing fibers, as will be understood by those of ordinary skill in the art, the fiber optic cable assembly 1000 can include N sensing fibers, where N>1.

The fiber optic cable assembly 1000 can also include acoustic mirrors 1008a-1008d around the sensing fibers 1004a-1004d for focusing the incoming pressure or acoustic waves towards the sensing fibers 1004a-1004d. The mirrors 1008a-1008d can have a parabolic shape, a conic shape, or other shapes. The mirrors 1008a-1008d can be made of dense materials and arranged to have a high impedance, for example, having an impedance higher than that of air or surrounding environments. In some cases, the mirrors 1008a-1008d can be made of metamaterial and arranged as an acoustic-photonic crystal. In some cases, the mirrors 1008a-1008d can have a low mechanical coupling index so that the mirrors 1008a-1008d reflect, instead of absorbing, the incoming pressure or acoustic waves. The mirrors 1008a-1008d can also have a low refractive index (for example, a refractive index close to the refractive index of air or surrounding environments or a refractive index close to one) to avoid disturbance to the coupling of the evanescent electromagnetic waves. The mirrors 1008a-1008d can divide a space inside the housing 1002 into isolated sections 1010a-1010d, where each section extends longitudinally along the housing 1002, and each section includes one of the sensing fibers 1004a-1004d. Each section corresponds to a direction. A high density fluid with a low refractive index (for example, a refractive index close to the refractive index of air or surrounding environments or a refractive index close to one) can fill the sections 1010a-1010d to keep the sensing fibers 1004a-1004d immobilized.

The sensing fibers 1004a-1004d (denoted as $S_i$, i=1, ..., 4) are single-mode fibers, each having a respective refractive index $n_i$. The sensing fibers 1004a-1004d can be connected to one or more transmitters, and the one or more transmitters transmit laser signals to the sensing fibers 1004a-1004d. Each sensing fiber $S_i$ carries an input laser signal of a distinct wavelength $\lambda_i$, that is, $\lambda_1 \neq \lambda_2 \neq \lambda_3 \neq \lambda_4$. In other words, each sensing fiber carries a laser signal of a distinct frequency (note that frequency and wavelength has a one-to-one mapping). The input laser signal can be a pulsed or continuous signal. The signal fiber 1006 (denoted as $S_0$) is a multi-mode fiber designed to carry laser signals of the wavelength range in the sensing fibers 1004a-1004d. In other words, the signal fiber 1006 can carry laser signals of one or more of wavelengths $\lambda_1$, $\lambda_2$, $\lambda_3$, or $\lambda_4$. The signal fiber 1006 has a refractive index $n_0$, where $n_0$ can be constant or graded. The signal fiber 1006 can be connected to a receiver to receive evanescent coupling signal(s) coupled from the input signals in the sensing fibers 1004a-1004d. As discussed earlier, an evanescent coupling signal in the signal fiber $S_0$ responsive to an input signal in the sensing fiber $S_i$ has the same wavelength $\lambda_i$. If each of the sensing fibers 1004a-1004d causes an evanescent coupling signal in the signal fiber 1006, the signal fiber 1006 can output evanescent coupling signals of wavelengths $\lambda_1$, $\lambda_2$, $\lambda_3$, and $\lambda_4$. In some implementations, the fiber optic cable assembly 1000 can be connected to the laser box 804.

Assume that a distance from the sensing fiber $S_i$ (i=1 N, N is the total number of the sensing fibers) to the signal fiber $S_0$ is $d_i$, that the refractive index of the sensing fiber $S_i$ is $n_i$, and that the refractive index of the signal fiber $S_0$ is $n_0$. The distance $d_i$ and the refractive index $n_i$ of the sensing fiber can change with variations in the environment around the fiber optic cable assembly 1000, such as temperature, strain-stress, or pressure. For example, when a pressure or acoustic wave impacts on the fiber optic cable assembly 1000, the distance $d_i$ can change because the pressure or acoustic wave can shift the sensing fiber $S_i$. In some cases, the refractive index $n_i$ can vary due to a change in temperature. When the changes in the distance $d_i$ and the refractive index $n_i$ meet conditions discussed earlier (that is, $d_i \leq 1/\beta_i$, and $n_0$ and $n_i$ have similar values), the sensing fiber $S_i$ can transfer signal energy to the signal fiber $S_0$.

As will be discuss in detail later, the following three modes of operation, can be used to couple signals from the sensing fibers to the signal fiber:
  (1) Evanescent coupling by distance shift: The fiber optic cable assembly 1000 is designed such that $d_i > 1/\beta_i$ and $n_0 = n_1 = \ldots = n_N$. Evanescent coupling occurs when the environmental variation causes the distance shift such that $d_i \leq 1/\beta_i$.
  (2) Evanescent coupling by refractive index change: The fiber optic cable assembly 1000 is designed such that $d_i = 1/\beta_i$ and $n_i \neq n_0$. Evanescent coupling occurs when the environmental variation causes a change in the refractive index $n_i$ such that $n_i$ and $n_0$ have similar values.

(3) Evanescent coupling by distance shift and refractive index change: The fiber optic cable assembly 1000 is designed such that $d_i > 1/\beta_i$ and $n_i \neq n_0$. Evanescent coupling occurs when the environmental variation causes $d_i \leq 1/\beta_i$ and similar values for $n_0$ and $n_i$.

In operation modes 2 and 3, the refractive index of the sensing fiber is typically smaller than the refractive index of the signal fiber, that is, $n_i < n_0$. This can be achieved by accurately doping the fiber core material. Furthermore, the refractive index of the shared cladding between the sensing fiber and the signal fiber is significantly smaller than the refractive index of the sensing fiber, that is, $n_{cladding} < \min(n_1, \ldots n_N)$.

In some implementations, by analyzing frequency component(s) and amplitude(s) of the coupled evanescent signal(s) in the signal fiber, the orientation and strength of the environmental perturbation can be determined. In some cases, the amplitude of an evanescent coupling signal can depend on the separation distance between the coupled fibers. For example, a stronger environmental perturbation can shift the sensing fiber more, causing a smaller separation distance that leads to a stronger evanescent coupling signal. In addition, as discussed earlier, each sensing fiber carries an input signal of a distinct wavelength $\lambda_i$ (or frequency). For example, if the evanescent coupling signal received from the signal fiber includes wavelengths $\lambda_1$ and $\lambda_2$, then the environmental perturbation is determined to come from the directions corresponding to the sensing fibers $S_1$ and $S_2$. Based on the amplitude of the evanescent coupling signal of wavelength $\lambda_1$, the strength of the environmental perturbation from the direction of the sensing fiber $S_1$ can be determined. Similarly, based on the amplitude of the evanescent coupling signal of wavelength $\lambda_2$, the strength of the environmental perturbation from the direction of the sensing fiber $S_2$ can be determined.

In some implementations, each sensing fiber can also act as a regular distributed fiber optic sensor. As a result, in addition to the signal fiber connected to the receiver for receiving the evanescent coupling signals, the sensing fibers can also be connected to one or more receivers for receiving the reflected signals in the sensing fibers. By analyzing the reflected signals in the sensing fibers and the coupled evanescent signals in the signal fiber, the direction, amplitude, and frequency of the environmental disturbance or pressure/acoustic wave can be determined. For example, the reflected signal within the sensing fibers due to an environmental disturbance can be analyzed (for instance, analyzing the signal intensity changes in the sensing fibers) using known distributed fiber optics techniques. The results can be correlated and used with the data in the signal fiber to improve the accuracy of the directional sensing.

Operation Mode 1: Evanescent Coupling by Distance Shift

In operation mode 1, the sensing fiber $S_i$ is located at a distance $d_i > 1/\beta_i$ measured from the perimeter of the signal fiber $S_0$, where $\beta_i$ is determined by the wavelength of the input signal in the sensing fiber $S_i$ as shown in Equation (1). The signal fiber and the sensing fibers are assumed to have the same refractive index, that is, $n_0 = n_1 = \ldots = n_N$, where N is the total number of sensing fibers. The signal fiber is anchored or fixed to center of the fiber bundle, and the sensing fibers are displaced along the radial direction of the fiber bundle and not anchored. As a result, the fiber optic cable assembly 1000 is set in a state of unstable equilibrium so that any environmental perturbation can displace one, or multiple, sensing fibers along the radial direction. Evanescent coupling between any sensing fibers $S_i$ and the signal fiber $S_0$ occurs if, and only if, $d_i \leq 1/\beta_i$. In other words, if the displacement $\Delta d_i$ caused by the environmental perturbation is such that $d_i - \Delta d_i \leq 1/\beta_i$, then the signal can be coupled from the corresponding sensing fiber $S_i$ to the signal fiber $S_0$.

Figure 11:
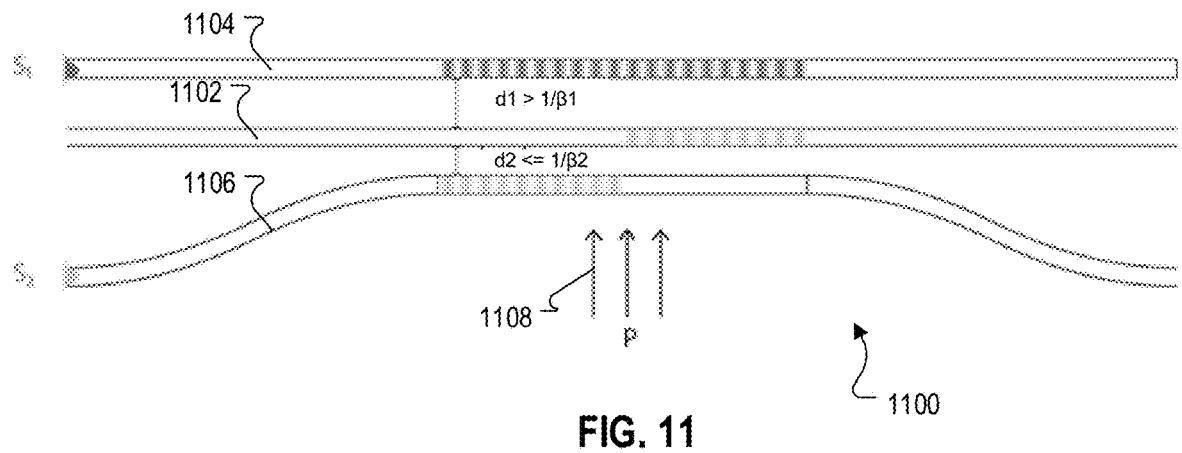
FIG. 11 illustrates a first example of operation mode 1 for a directional sensitive fiber optic cable assembly of a second implementation of a directional sensitive fiber optic cable system, according to some implementations.

FIG. 11 illustrates a first example 1100 of operation mode 1 for a directional sensitive fiber optic cable assembly of a second implementation of a directional sensitive fiber optic cable system, according to some implementations. The example 1100 includes a signal fiber 1102, and two sensing fibers 1104 and 1106 (that is, $S_1$ and $S_2$). Input signals of different wavelengths $\lambda_1$ and $\lambda_2$ are transmitted to the sensing fibers 1104 and 1106, respectively. The two sensing fibers 1104 and 1106 are initially located at distances $d_1$ and $d_2$ from the signal fiber, respectively, where $d_1 > 1/\beta_1$ and $d_2 > 1/\beta_2$. In some implementations, $$d_1 > \max\left(\frac{1}{\beta_1}, \frac{1}{\beta_2}\right) \text{ and } d_2 > \max\left(\frac{1}{\beta_1}, \frac{1}{\beta_2}\right).$$

An incoming perturbation 1108 displaces the sensing fiber 1106 and moves the sensing fiber 1106 closer to the signal fiber 1102. When the separation distance between the sensing fiber 1106 and the signal fiber 1102 is smaller than or equal to the separation threshold $1/\beta_2$, then evanescent coupling takes place and a portion of the signal of wavelength $\lambda_2$ is transferred from the sensing fiber 1106 to the signal fiber 1102.

Figure 12:
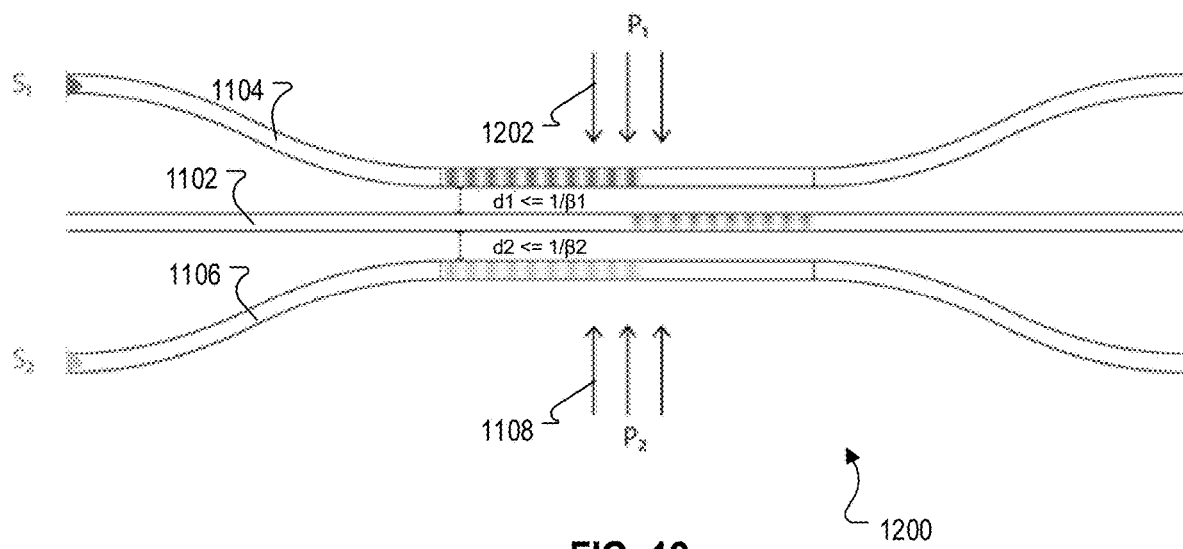
FIG. 12 illustrates a second example of operation mode 1 for a directional sensitive fiber optic cable assembly of a second implementation of a directional sensitive fiber optic cable system, according to some implementations.

FIG. 12 illustrates a second example 1200 of operation mode 1 for a directional sensitive fiber optic cable assembly of a second implementation of a directional sensitive fiber optic cable system, according to some implementations. Same as the example 1100, the example 1200 includes the signal fiber 1102 and the two sensing fibers 1104 and 1106. In addition to the incoming perturbation 1108 that moves the sensing fiber 1106 closer to the signal fiber 1102, the example 1200 includes another incoming perturbation 1202 that moves the sensing fiber 1104 closer to the signal fiber 1102. When the separation distance between the sensing fiber 1104 and the signal fiber 1102 is smaller than or equal to the separation threshold $1/\beta_1$, and the separation distance between the sensing fiber 1106 and the signal fiber 1102 is smaller than or equal to the separation threshold $1/\beta_2$, then evanescent coupling takes place, where a portion of the signal of wavelength $\lambda_1$ is transferred from the sensing fiber 1104 to the signal fiber 1102, and a portion of the signal of wavelength $\lambda_2$ is transferred from the sensing fiber 1106 to the signal fiber 1102.

Operation Mode 2: Evanescent Coupling by Refractive Index Change

In operation mode 2, the sensing fiber $S_i$ is located at a distance $d_i = 1/\beta_i$ measured from the perimeter of the signal fiber $S_0$. The sensing fibers have different refractive indexes than the signal fiber, that is, $n_i \neq n_0$ and typically $n_i < n_0$ for $i = 1, \ldots N$. The signal and sensing fibers are anchored to prevent any radial displacement. As a result, the fiber optic cable assembly 1000 is set in a state of stable equilibrium. Evanescent coupling between any sensing fiber $S_i$ and the signal fiber $S_0$ occurs if, and only if, $n_i = n_0$. When the refractive index change $\Delta n_i$ due to environmental variations is such that $n_i + \Delta n_i = n_0$, then the signal can couple from the corresponding sensing fiber $S_i$ to the signal fiber $S_0$. The refractive index change, $\Delta n_i$, can be induced by any environmental factor, such as temperature, pressure, and strain.

Figure 13:
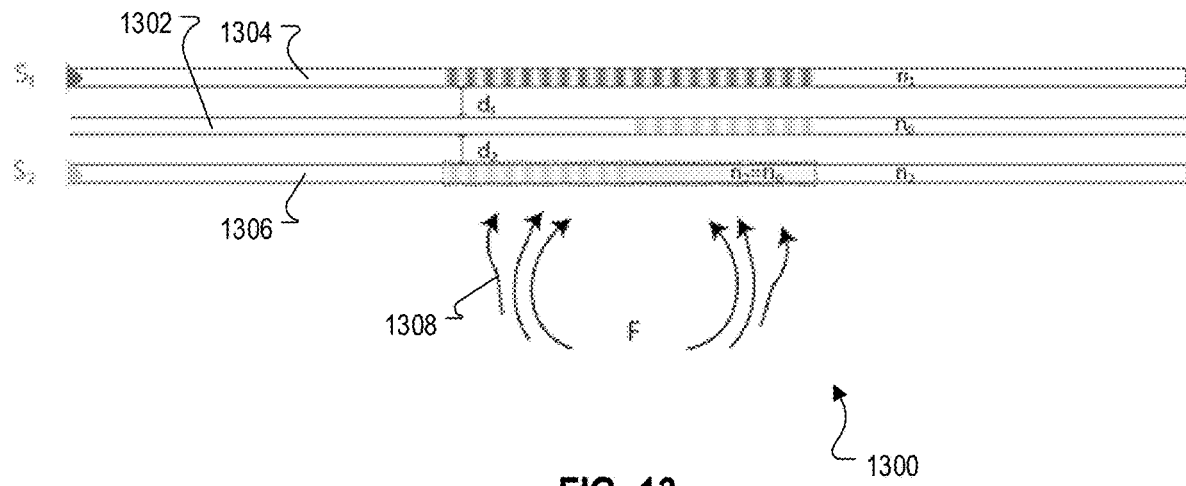
FIG. 13 illustrates a first example of operation mode 2 for a directional sensitive fiber optic cable assembly of a second implementation of a directional sensitive fiber optic cable system, according to some implementations.

FIG. 13 illustrates a first example 1300 of operation mode 2 for a directional sensitive fiber optic cable assembly of a second implementation of a directional sensitive fiber optic cable system, according to some implementations. The example 1300 includes a signal fiber 1302, and two sensing fibers 1304 and 1306 (that is, $S_1$ and $S_2$). Input signals of different wavelengths $\lambda_1$ and $\lambda_2$ are transmitted into the sensing fibers 1304 and 1306, respectively. The two sensing fibers 1304 and 1306 are located at distances $d_1$ and $d_2$ from the signal fiber, respectively, where $d_1=1/\beta_1$ and $d_2=1/\beta_2$. The two sensing fibers 1304 and 1306 have the refractive index $n_1$ and $n_2$, respectively, where $n_1 \neq n_0$, and $n_2 \neq n_0$. An incoming perturbation 1308 changes the refractive index of the sensing fiber 1306 such that $n_2+\Delta n_2=n_0$. As a result, evanescent coupling takes place and a portion of the signal of wavelength $\lambda_2$ is transferred from the sensing fiber 1306 to the signal fiber 1302.

Figure 14:
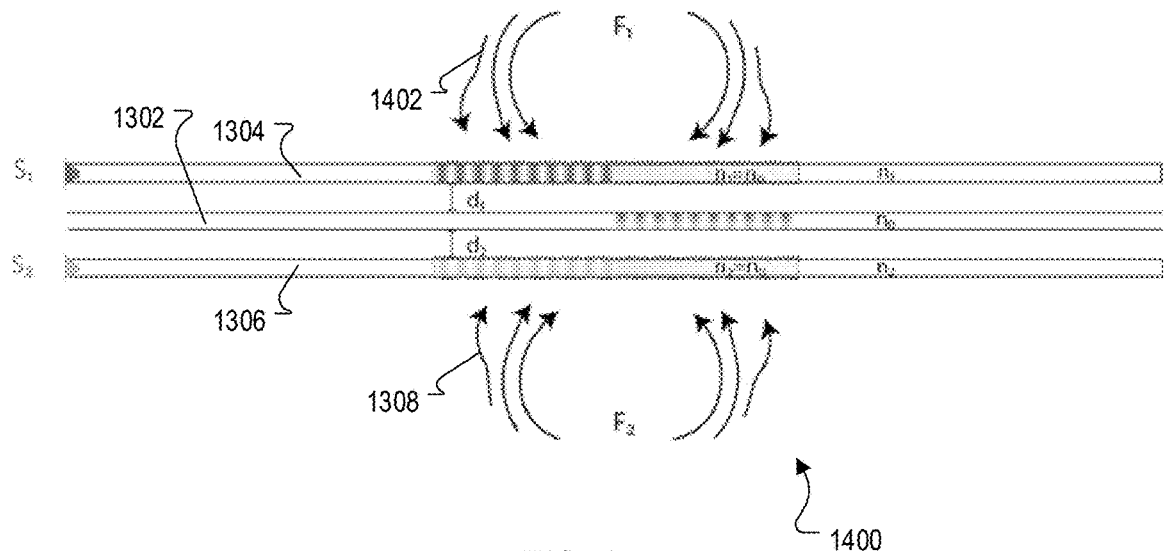
FIG. 14 illustrates a second example of operation mode 2 for a directional sensitive fiber optic cable assembly of a second implementation of a directional sensitive fiber optic cable system, according to some implementations.

FIG. 14 illustrates a second example 1400 of operation mode 2 for a directional sensitive fiber optic cable assembly of a second implementation of a directional sensitive fiber optic cable system, according to some implementations. Same as the example 1300, the example 1400 includes the signal fiber 1302 and the two sensing fibers 1304 and 1306. In addition to the incoming perturbation 1308 that increases the refractive index of the sensing fiber 1306 to $n_0$, the example 1400 includes another incoming perturbation 1402 that increases the refractive index of the sensing fiber 1304 to $n_0$. As a result, evanescent coupling takes place, where a portion of the signal of wavelength $\lambda_1$ is transferred from the sensing fiber 1304 to the signal fiber 1302, and a portion of the signal of wavelength $\lambda_2$ is transferred from the sensing fiber 1306 to the signal fiber 1302.

Operation Mode 3: Evanescent Coupling by Refractive Index Change and Displacement Operation mode 3 is a combination of operation modes 1 and 2. The sensing fiber $S_i$ is located at a distance $d_i > 1/\beta_i$ measured from the perimeter of the signal fiber $S_0$. In addition, the refractive index of the sensing fiber $S_i$ is set so that $n_i \neq n_0$. In operation mode 3, the signal fiber is anchored to the center of fiber bundle, and the sensing fibers can be displaced along the radial direction of the fiber bundle and not anchored. As a result, the fiber optic cable assembly 1000 is set in a state of unstable equilibrium so that any perturbation can displace, along the radial direction, and change the refractive index of one, or multiple, sensing fibers. Evanescent coupling between any sensing fiber $S_i$ and the signal fiber $S_0$ occurs if, and only if, $d_i \leq 1/\beta_i$ and $n_i=n_0$. If these conditions are met, signal energy can be transferred from the corresponding sensing fiber $S_i$ to the signal fiber $S_0$.

Figure 15:
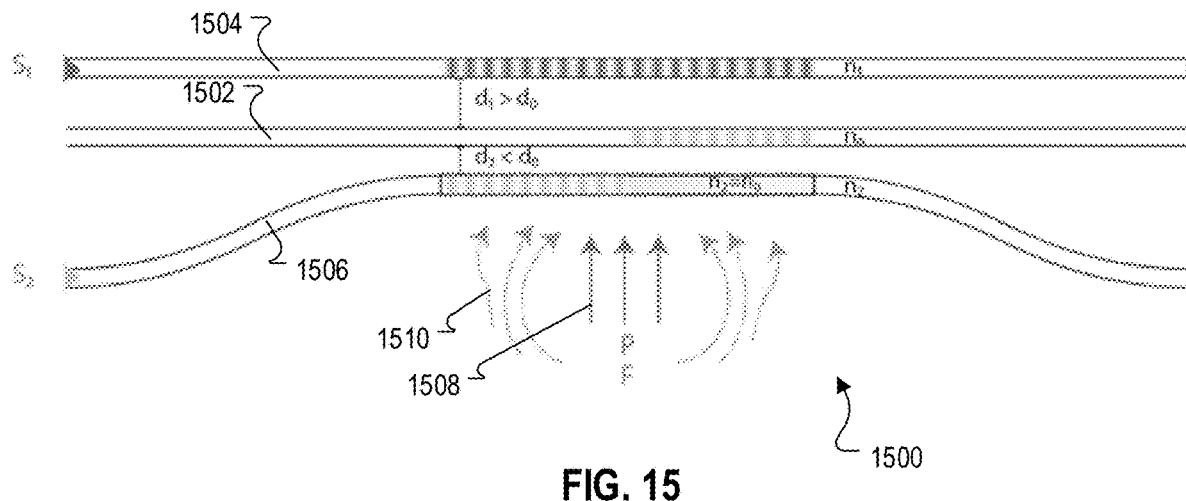
FIG. 15 illustrates a first example of operation mode 3 for a directional sensitive fiber optic cable assembly of a second implementation of a directional sensitive fiber optic cable system, according to some implementations.

FIG. 15 illustrates a first example 1500 of operation mode 3 for a directional sensitive fiber optic cable assembly of a second implementation of a directional sensitive fiber optic cable system, according to some implementations. The example 1500 includes a signal fiber 1502, and two sensing fibers 1504 and 1506. Input signals of different wavelengths $\lambda_1$ and $\lambda_2$ are transmitted to the sensing fibers 1504 and 1506, respectively. The two sensing fibers 1504 and 1506 are located at distances $d_1$ and $d_2$ from the signal fiber, respectively, where $d_1 > 1/\beta_1$ and $d_2 > 1/\beta_2$. A perturbation 1508 displaces the sensing fiber 1506 and moves the sensing fiber 1506 closer to the signal fiber 1502. In addition, a perturbation 1510 changes the refractive index of the sensing fiber 1506 to $n_0$. When the separation distance between the sensing fiber 1506 and the signal fiber 1502 is smaller than or equal to the separation threshold $1/\beta_2$ and the refractive index of the sensing fiber 1506 becomes $n_0$, then evanescent coupling takes place and a portion of the signal of wavelength $\lambda_2$ is transferred from the sensing fiber 1506 to the signal fiber 1502.

Figure 16:
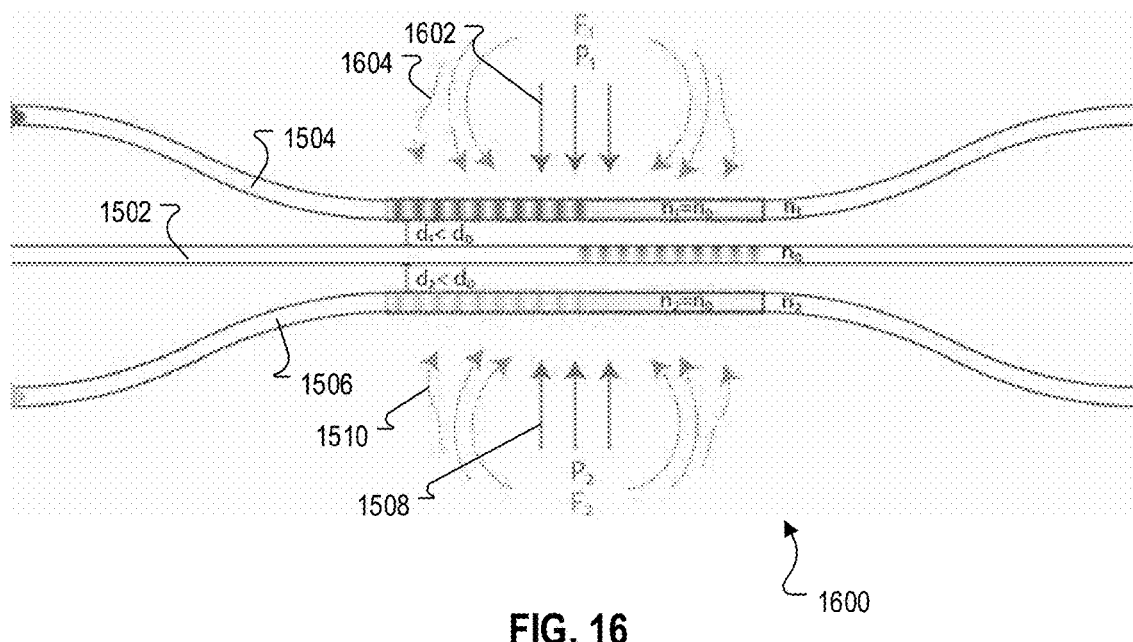
FIG. 16 illustrates a second example of operation mode 3 for a directional sensitive fiber optic cable assembly of a second implementation of a directional sensitive fiber optic cable system, according to some implementations.

FIG. 16 illustrates a second example 1600 of operation mode 3 for a directional sensitive fiber optic cable assembly of a second implementation of a directional sensitive fiber optic cable system, according to some implementations. Same as the example 1500, the example 1600 includes the signal fiber 1502 and the two sensing fibers 1504 and 1506. In addition to the perturbation 1508 that reduces the distance between the sensing fiber 1506 and the signal fiber 1502 to be smaller than or equal to $1/\beta_2$ and the perturbation 1510 that changes the refractive index of the sensing fiber 1506 to $n_0$, the example 1600 includes a perturbation 1602 that reduces the distance between the sensing fiber 1504 and the signal fiber 1502 to be small than or equal to $1/\beta_1$, and a perturbation 1604 that changes the refractive index of the sensing fiber 1504 to $n_0$. As a result, evanescent coupling takes place, where a portion of the signal of wavelength $\lambda_1$ is transferred from the sensing fiber 1504 to the signal fiber 1502, and a portion of the signal of wavelength $\lambda_2$ is transferred from the sensing fiber 1506 to the signal fiber 1502.

The directional sensitive fiber optic cable assembly in FIG. 1-7 or 10 can be strapped outside a tubing (or a casing), as will be shown in FIGS. 18-21, and lowered into a wellbore with the tubing. The laser box 804 can be at the terranean surface of the wellbore. For example, clamps can be used to strap the fiber optic cable assembly as a straight line longitudinally along the tubing. In some implementations, the directional sensitive fiber optic cable assembly can be marked on one side with a scribe line indicating a direction, for example, a direction of up or out. In some cases, the scribe line can be longitudinally marked along a center of the housing portion of an isolated section. The purpose of the marking is to make sure that the same isolated section is facing in the same direction along the tubing, for example, outwards from the tubing. During installation, the fiber optic cable assembly can be strapped outside the tubing with the scribe line facing up or out with respect to the tubing so that one isolated section is facing away from the tubing and another section is facing the tubing.

After the fiber optic cable assembly is strapped outside the tubing, the fiber optic cable assembly will be run into the wellbore together with the tubing, where the tubing rotates slowly in one direction when running into the wellbore. The rotation stops once the tubing is settled in the wellbore. To understand the orientation of the fiber optic cable assembly in the wellbore, a fiber optic gyro can be used to estimate the amount of the rotation that occurred when the tubing is running into the wellbore. For example, for a horizontal wellbore, the orientation of the fiber optic cable assembly in the wellbore can provide information on which isolated section is facing up towards the earth surface (or at a high side) and which isolated section is facing down away from the earth surface (or at a low side).

Figure 17:
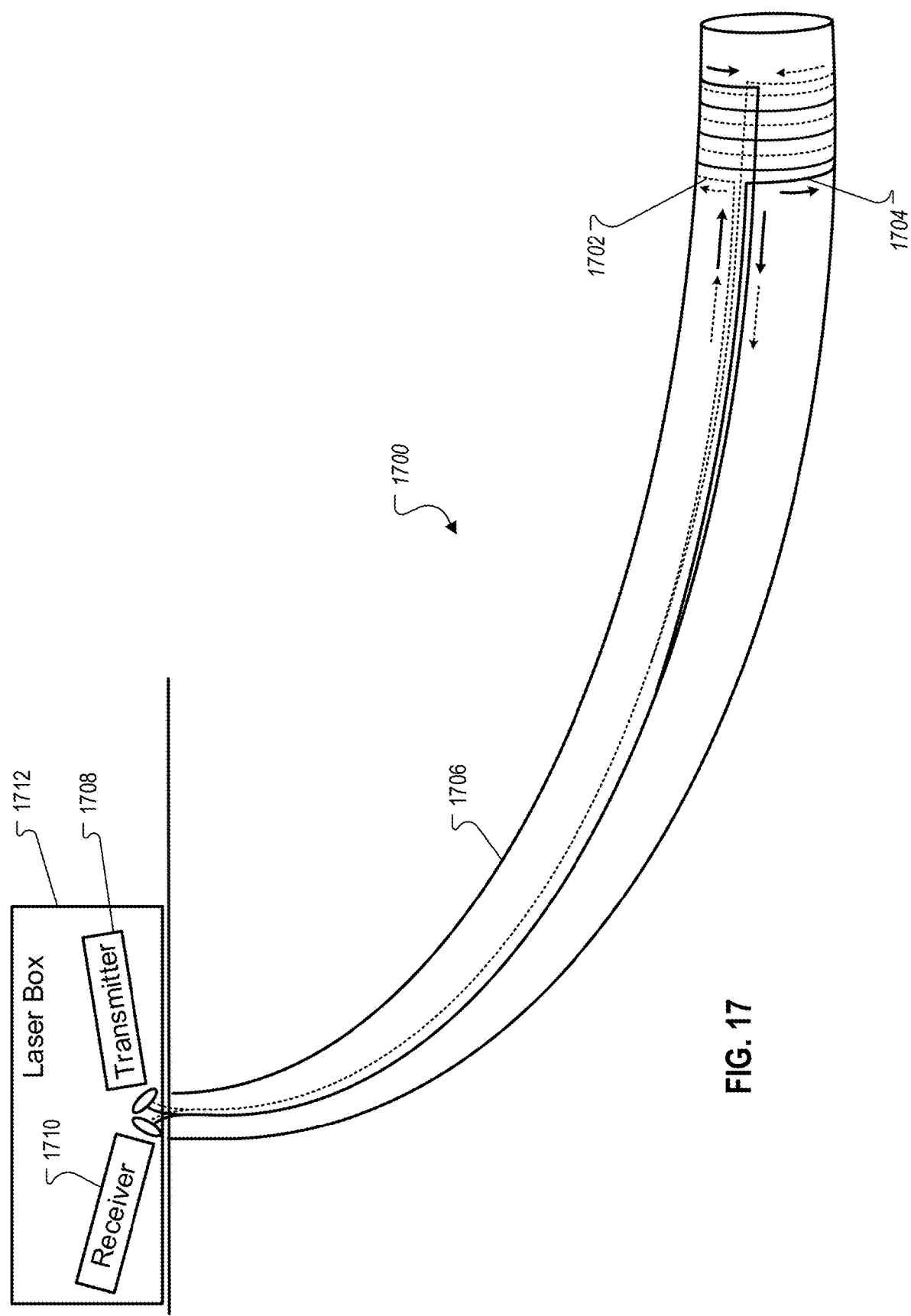
FIG. 17 illustrates a schematic of a fiber optic gyro, according to some implementations.

FIG. 17 illustrates a schematic of a fiber optic gyro 1700, according to some implementations. The fiber optic gyro 1700 can be used to determine an amount of tubing rotation that occurs when the tubing is running downhole. The fiber optic gyro 1700 includes two optical fibers 1702 and 1704 (illustrated as the dash line and the solid line, respectively) wrapped on an outer surface of the tubing 1706 and wrapped in opposite directions from each other. The optical fibers 1702 and 1704 can be wrapped at an end of the tubing 1706 towards downhole so that a full rotation can be estimated when the tubing 1706 running from the surface of the wellbore to the downhole. For example, the fibers 1702 and 1704 can wrap around the tubing 1706 and run into the wellbore with the tubing 1706. In some implementations, the fibers 1702 and 1704 can wrap, for example, 20-40 turns around the tubing 1706. The fibers 1702 and 1704 are different than the fibers for directional sensitivity detection, for example, 104a-104h, 1004a-1004d, and 1006. In some implementations, the two optical fibers 1702 and 1704 can be in one fiber optic cable where the two fibers are in one protective cable tube.

The fibers 1702 and 1704 can connect to a laser box 1712 at the terranean surface of the wellbore. The laser box 1712 can include a transmitter (or a laser source) 1708 and a receiver (or a detector) 1710. The transmitter 1708 can connect to one end of the fiber 1702 and the receiver 1710 can connect to the other end of the fiber 1702. Similarly, the transmitter 1708 can connect to one end of the fiber 1704 and the receiver 1710 can connect to the other end of the fiber 1704. The transmitter 1708 can emit laser lights or signals with a specific frequency and wavelength into the fibers 1702 and 1704. Because the fibers 1702 and 1704 are wrapped in opposite directions, the laser lights emitted to the fibers 1702 and 1704 are traveled in opposite directions around the tubing 1706. The receiver 1710 can receive returned laser lights from the fibers 1702 and 1704, and determine an amount of the tubing rotation based on the received laser lights. In some implementations, the laser box 1712 can connect to one or more computers or processors to configure pulse transmissions at the transmitter 1708, or process the returned laser lights receiving at the receiver 1710 to determine the tubing rotation, or both, using one or more software programs.

The fiber optic gyro 1700 can estimate an angular velocity of the tubing rotation based on a Sagnac effect, and further estimate the amount of the tubing rotation based on the angular velocity. For example, the transmitter 1708 emits a first laser light into the fiber 1702 and a second laser light into the fiber 1704, and the receiver 1710 receives the returned first laser light and the returned second laser light. The first laser light and the second laser light can be transmitted at the substantially similar times (for example, at the same time) or different times. Based on the received laser lights, the computer or the processor connected to the receiver 1710 can determine a first time duration, $t_1$, for the first laser light to travel through the fiber 1702 and a second time duration, $t_2$, for the second laser light to travel through the fiber 1704. The angular velocity of the tubing rotation can be determined based on a difference between $t_1$ and $t_2$, $\Delta t$, by solving $\omega$ in the following equation:

$$\Delta t = t_1 - t_2 = \frac{4\pi R^2 \omega}{c^2 - R^2 \omega^2},$$

where $\omega$ is the angular velocity of the tubing rotation (for example, in a unit of radians per second), R is the radius of the tubing, and c is the speed of light. In some implementations, a time duration for the tubing running from the surface to the downhole, T, can be determined, and the amount of tubing rotation (for example, in a unit of radians) can be determined by $\omega*T$. The orientation of the directional sensitive fiber optic cable assembly can be determined based on the amount of tubing rotation, for example, by determining a number of full turns the tubing has made and the angle of the partial turn.

In some implementations, the laser box 804 in FIG. 8 and the laser box 1712 in FIG. 17 can be the same or different laser boxes. In case of the same laser box, when the tubing is running into the wellbore, the laser box can first connect to the fiber optic gyro 1700 to transmit and receive laser signals. After the tubing has stopped the rotation and settled into the wellbore, the laser box can then connect to the fiber optic cable assembly in FIG. 1-7 or 10.

The directional sensitive fiber optic cable assembly can be used for different applications, such as determining directions of seismic sound waves, separating a compartment flow and a tubing flow, determining a type of fluid flowing within a compartment, cross flow detection, and other scenarios and use cases.

Figure 18:
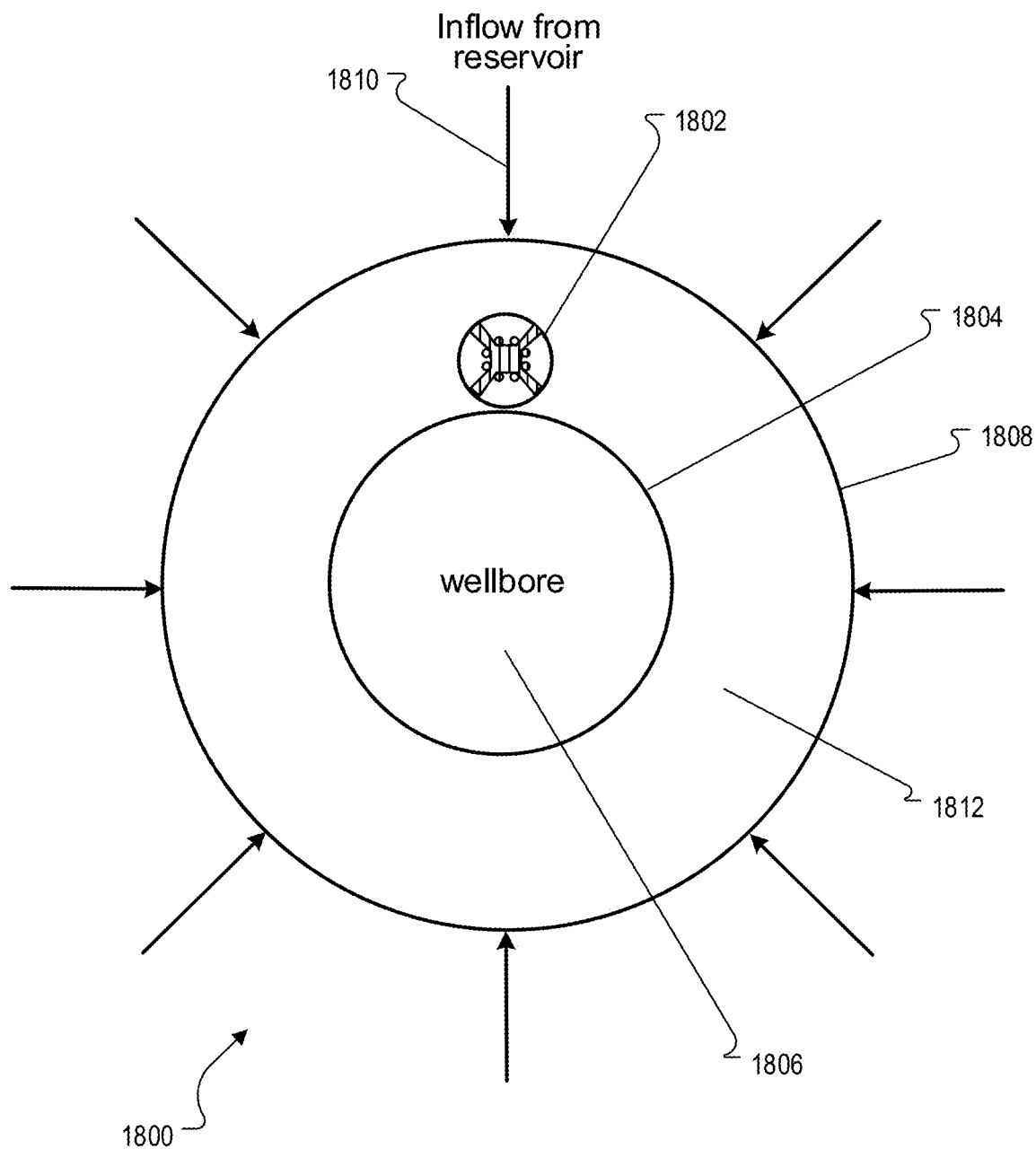
FIG. 18 illustrates a cross section of a schematic of a directional sensitive fiber optic cable assembly in a wellbore for isolating a compartment flow and a tubing flow, according to some implementations.

FIG. 18 illustrates a cross section 1800 of a schematic of a directional sensitive fiber optic cable assembly in a wellbore for isolating a compartment flow and a tubing flow, according to some implementations. The cross section 1800 includes a directional sensitive fiber optic cable assembly 1802 strapped outside a tubing 1804 in a wellbore 1806. The fiber optic cable assembly 1802 can be an assembly in FIG. 1-7 or 10. Fluids 1810 (that is, inflow from reservoir), for example, hydrocarbon fluids, can flow from a formation (or a reservoir) inner surface 1808 into a compartment 1812 (that is, an annulus between the formation inner surface 1808 and the tubing 1804) and the wellbore 1806. In some implementations, with inflow control devices (ICDs) or interval control valves (ICVs) on the tubing 1804, fluids 1810 can flow into the wellbore 1806.

Figure 19:
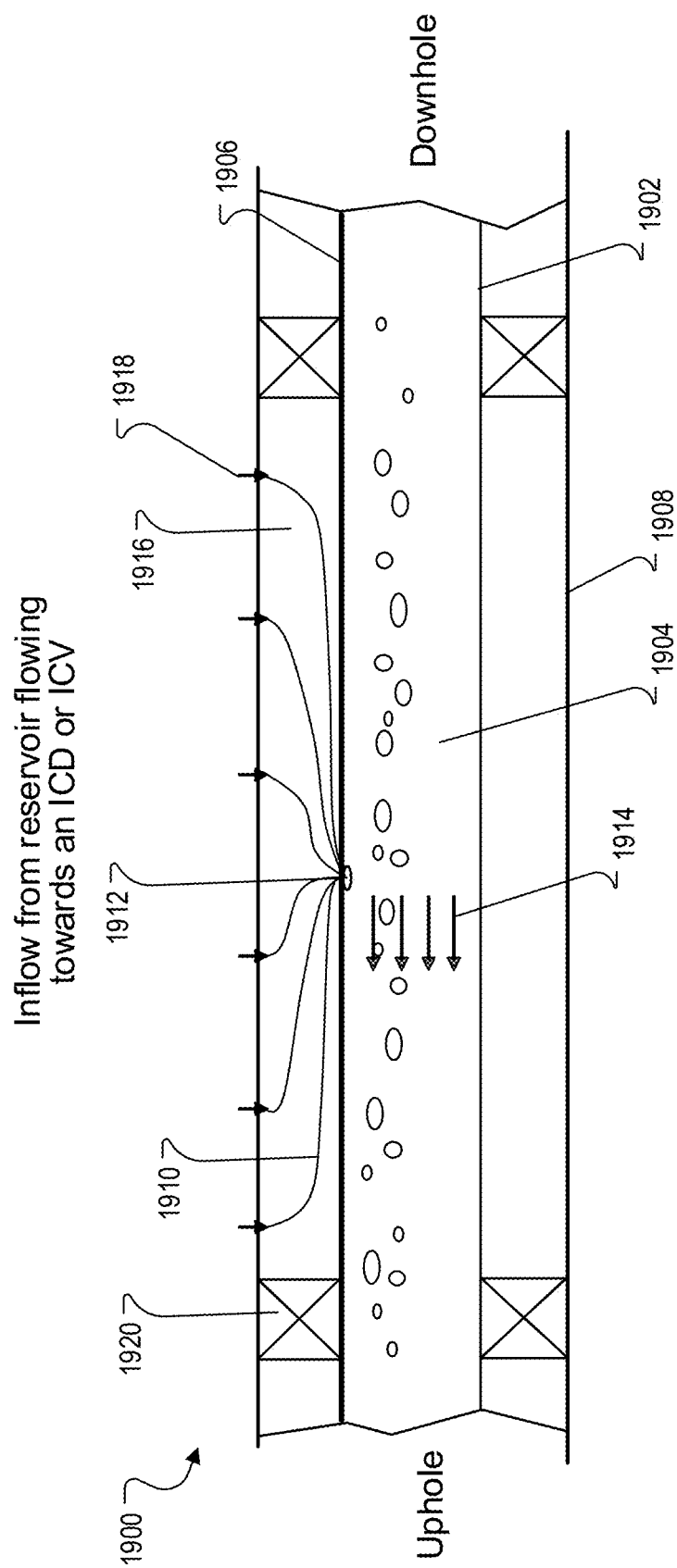
FIG. 19 illustrates a longitudinal view of a schematic of a directional sensitive fiber optic cable assembly in a wellbore for isolating a compartment flow and a tubing flow, according to some implementation.

FIG. 19 illustrates a longitudinal view 1900 of a schematic of a directional sensitive fiber optic cable assembly in a wellbore for isolating a compartment flow and a tubing flow, according to some implementation. The longitudinal view 1900 includes a fiber optic cable assembly 1906 strapped outside a tubing 1902 in a wellbore 1904, and a formation inner surface 1908. The fiber optic cable assembly 1906 can be an assembly in FIG. 1-7 or 10. The wellbore 1904 can be a horizontal or vertical wellbore. Fluids 1918 (that is, inflow from reservoir), such as hydrocarbon fluids, can flow from the formation (or a reservoir) inner surface 1908 into a compartment 1916 (that is, an annulus between the formation inner surface 1908 and the tubing 1902), and further flow into the wellbore 1904 through ICDs or ICVs 1912 on the tubing 1902. The down-flowing fluid (flowing from uphole to downhole) in the compartment 1916 is a compartment flow 1910, and the up-flowing fluid (flowing from downhole to uphole) in the tubing 1902 (or in the wellbore 1904) is a tubing flow 1914. The longitudinal view 1900 also includes packers 1920.

The fiber optic cable assembly 1906 can be used to differentiate between the down-flowing compartment flow 1910 and the up-flowing tubing flow 1914. For example, when strapping the fiber optic cable assembly 1906 outside the tubing 1902, based on the scribe line marked on the fiber optic cable assembly 1906, a first isolated section can face the tubing 1902 to sense the sound or environmental variation caused by the tubing flow 1914, and a second isolated section can face the compartment 1916 (or face away from the tubing 1902) to sense the sound or environmental variation caused by the compartment flow 1910.

For example, for the first implementation of the directional sensitive fiber optic cable system in FIGS. 1-7, when the transmitter 808 sends laser pulses into the fiber optic cables of the fiber optic cable assembly 1906, a computer or processor connected to the receiver 810 can identify received laser pulses from the first and second acoustically isolated sections. Based on the received laser pulses from the first and second acoustically isolated sections, the computer or the processor can determine flow velocities for the compartment flow 1910 and the tubing flow 1914, and further determine fluid densities and fluid compositions for the compartment flow 1910 and the tubing flow 1914. In some implementation, the fiber optic gyro is used to determine orientation of each acoustically isolated section in the wellbore.

In some implementations, the computer or the processor can determine eddy currents along the fiber optic cables in the first and second acoustically isolated sections. The eddy currents represent small variations in a pressure sound level. From the eddy currents, a wavenumber-frequency plot can be generated. Based on the wavenumber-frequency plot, the computer or the processor can determine flow velocities of the compartment flow 1910 and the tubing flow 1914 using Doppler shift effects generated by the sound waves of the compartment flow 1910 and the tubing flow 1914 (for example, a greater frequency for the down-flowing fluid of the compartment flow 1910 and a lesser frequency for the up-flowing fluid of the tubing flow 1914). Based on the flow velocities, fluid densities of the compartment flow 1910 and the tubing flow 1914 can be estimated. Based on the fluid densities, fluid compositions of the compartment flow 1910 and the tubing flow 1914 can be determined. In some implementations, using array processing, speeds of sound, not just flow velocities, of the compartment flow 1910 and the tubing flow 1914 can be estimated. Based on the speeds of sound, fluid compositions of the compartment flow 1910 and the tubing flow 1914 can be determined, for example, the speed of sound in gas is different from that in oil or water.

For the second implementation of the directional sensitive fiber optic cable system in FIG. 10, the transmitter 808 can transmit laser signals of different wavelengths $\lambda_1$ and $\lambda_2$ to the sensing fibers in the first section facing the tubing 1902 and the second section facing the compartment 1916, respectively. By analyzing the amplitude of the evanescent coupling signal of wavelength $\lambda_1$ in the signal fiber, as well as the signal intensity change in the sensing fiber in the first section, the pressure sound level of the tubing flow 1914 can be determined. Based on the pressure sound level, the flow velocity of the tubing flow 1914 can be determined. Similarly, the amplitude of the evanescent coupling signal of wavelength $\lambda_2$ in the signal fiber, as well as the signal intensity change in the sensing fiber in the second section, the flow velocity of the compartment flow 1910 can be determined.

Figure 20:
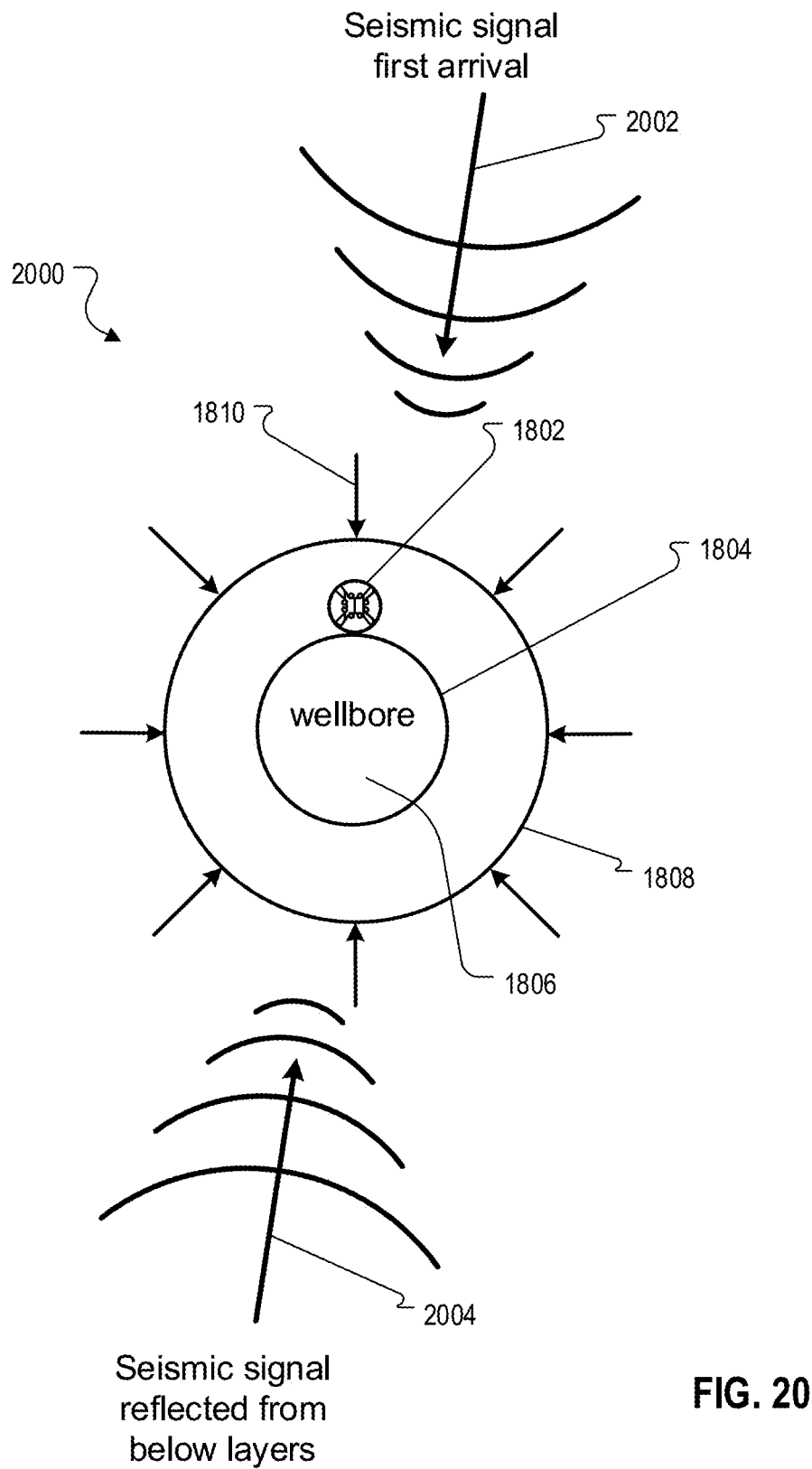
FIG. 20 illustrates a cross section of a schematic of a directional sensitive fiber optic cable assembly in a wellbore for seismic acquisitions, according to some implementations.

FIG. 20 illustrates a cross section 2000 of a schematic of a directional sensitive fiber optic cable assembly in a wellbore for seismic acquisitions, according to some implementations. The cross section 2000 includes a directional sensitive fiber optic cable assembly 1802 strapped outside a tubing 1804 in a wellbore 1806. The wellbore 1806 can be a horizontal wellbore. Fluids 1810, for example, hydrocarbon fluids, can flow from a formation (or a reservoir) inner surface 1808 into the wellbore 1806. The fiber optic cable assembly 1802 can be used to sense down-going sound 2002 caused by seismic signals directly from a seismic source at an earth surface and up-going sound 2004 caused by seismic signals reflected by earth subsurface layers below the tubing 1804.

Figure 21:
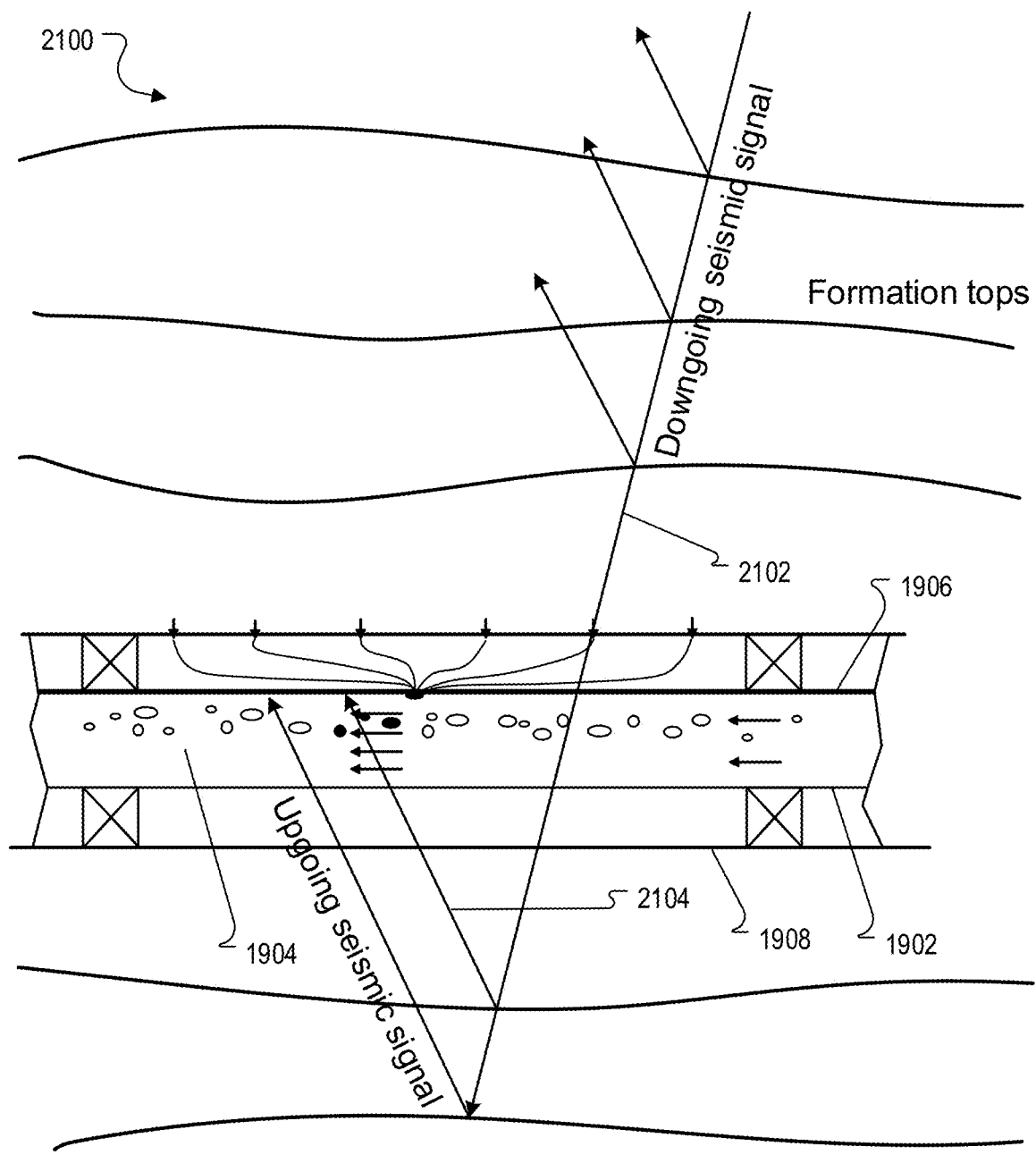
FIG. 21 illustrates a longitudinal view of a schematic of a directional sensitive fiber optic cable assembly in a wellbore for seismic acquisitions, according to some implementations.

FIG. 21 illustrates a longitudinal view 2100 of a schematic of a directional sensitive fiber optic cable assembly in a wellbore for seismic acquisitions, according to some implementations. The longitudinal view 2100 includes a fiber optic cable assembly 1906 strapped outside a tubing 1902 in a wellbore 1904, and a formation inner surface 1908.

The fiber optic cable assembly 1906 can be used to isolate down-going seismic signals 2102 directly from a seismic source at an earth surface and up-going seismic signals 2104 reflected by earth subsurface layers below the tubing 1902, and enable four-dimensional seismic acquisitions. For example, the fiber optic gyro can be used to determine orientation of each isolated section of the fiber optic cable assembly 1906 in the wellbore. A computer or processor connected to the fiber optic gyro can determine a first isolated section that is facing up towards the earth surface and a second isolated section that is facing down away from the earth surface.

For the first implementation of the directional sensitive fiber optic cable system in FIGS. 1-7, the transmitter 808 can send laser pulses into the fiber optic cables of the fiber optic cable assembly 1906, and a computer or processor connected to the receiver 810 can identify received laser pulses from the first and second isolated sections. Based on the received laser pulses from the first and second isolated sections, the computer or the processor can characterize, for example, the pressure sound levels of the down-going seismic signals 2102 and the up-going seismic signals 2104, and further determine, for example, fluid compositions in earth subsurface layers.

For the second implementation of the directional sensitive fiber optic cable system in FIG. 10, the transmitter 808 can transmit laser signals of different wavelengths $\lambda_1$ and $\lambda_2$ to the sensing fibers in the first section facing the down-going seismic signals 2102 and the second section facing the up-going seismic signals 2104, respectively. By analyzing the amplitudes of the evanescent coupling signals of wavelengths $\lambda_1$ and $\lambda_2$ in the signal fiber, as well as the signal intensity changes in the sensing fibers in the first and second sections, the pressure sound levels of the down-going seismic signals 2102 and the up-going seismic signals 2104 can be determined.

Figure 22:
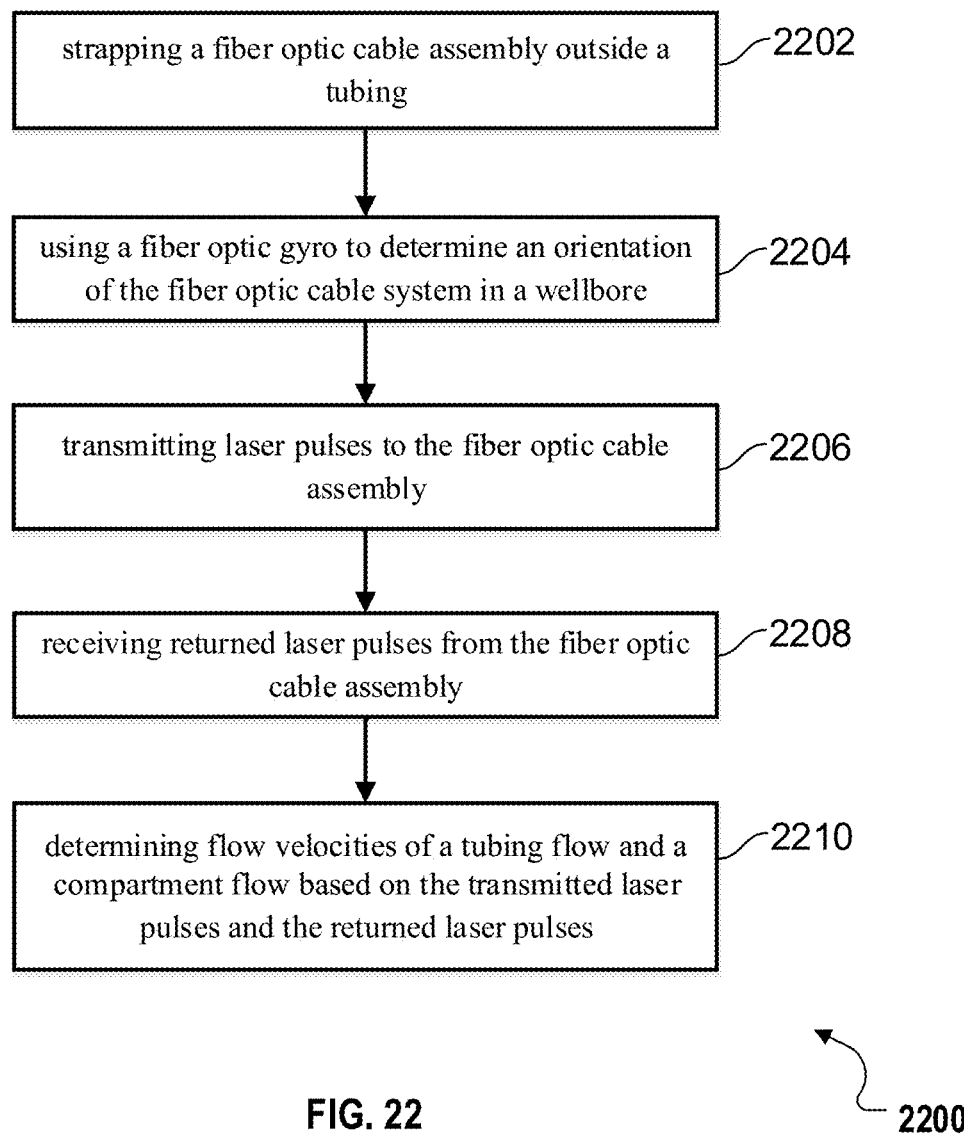
FIG. 22 illustrates a flowchart of an example method for isolating a compartment flow and a tubing flow using a first implementation of a directional sensitive fiber optic cable system, according to some implementations.

FIG. 22 illustrates a flowchart of an example method 2200 for isolating a compartment flow and a tubing flow using a first implementation of a directional sensitive fiber optic cable system, according to some implementations. The method 2200 can be used for the flow isolating described in FIGS. 18-19. At block 2202, a fiber optic cable assembly in FIGS. 1-7 is strapped outside a tubing as shown in FIGS. 18-19. For example, the fiber optic cable assembly is strapped so that one acoustically isolated section is facing away from the tubing for monitoring the compartment flow and another acoustically isolated section is facing the tubing for monitoring the tubing flow. A fiber optic gyro is also wrapped around the outer surface of the tubing as shown in FIG. 17. The fiber optic cable assembly and the fiber optic gyro are lowered into the wellbore together with the tubing. At block 2204, the fiber optic gyro is connected to the laser box 1712. As described in FIG. 17, based on the transmitted and returned laser pulses, the fiber optic gyro determines an amount of tubing rotation that occurs when the tubing is running downhole, and therefore determine an orientation of the fiber optic cable system when the fiber optic cable system is settled in the wellbore.

At block 2206, the fiber optic cable assembly is connected to the laser box 804. As described in FIG. 8, the transmitter 808 transmits laser pulses to the fibers positioned in the acoustically isolated sections of the fiber optic cable assembly. At block 2208, the receiver 810 receives returned laser pulses from the fibers in the fiber optic cable assembly. The laser box 804 and 1712 can be the same laser box, where the single laser box can first connect to the fiber optic gyro when the tubing is running downhole. Once the tubing is settled in the wellbore, the laser box is then switched to connect to the fiber optic cable assembly. At block 2210, as discussed earlier, based on the received laser pulses from the section facing the tubing, the flow velocity of the tubing flow is determined based on the pressure sound level. Similarly, based on the received laser pulses from the section facing away the tubing, the flow velocity of the compartment flow is determined.

Figure 23:
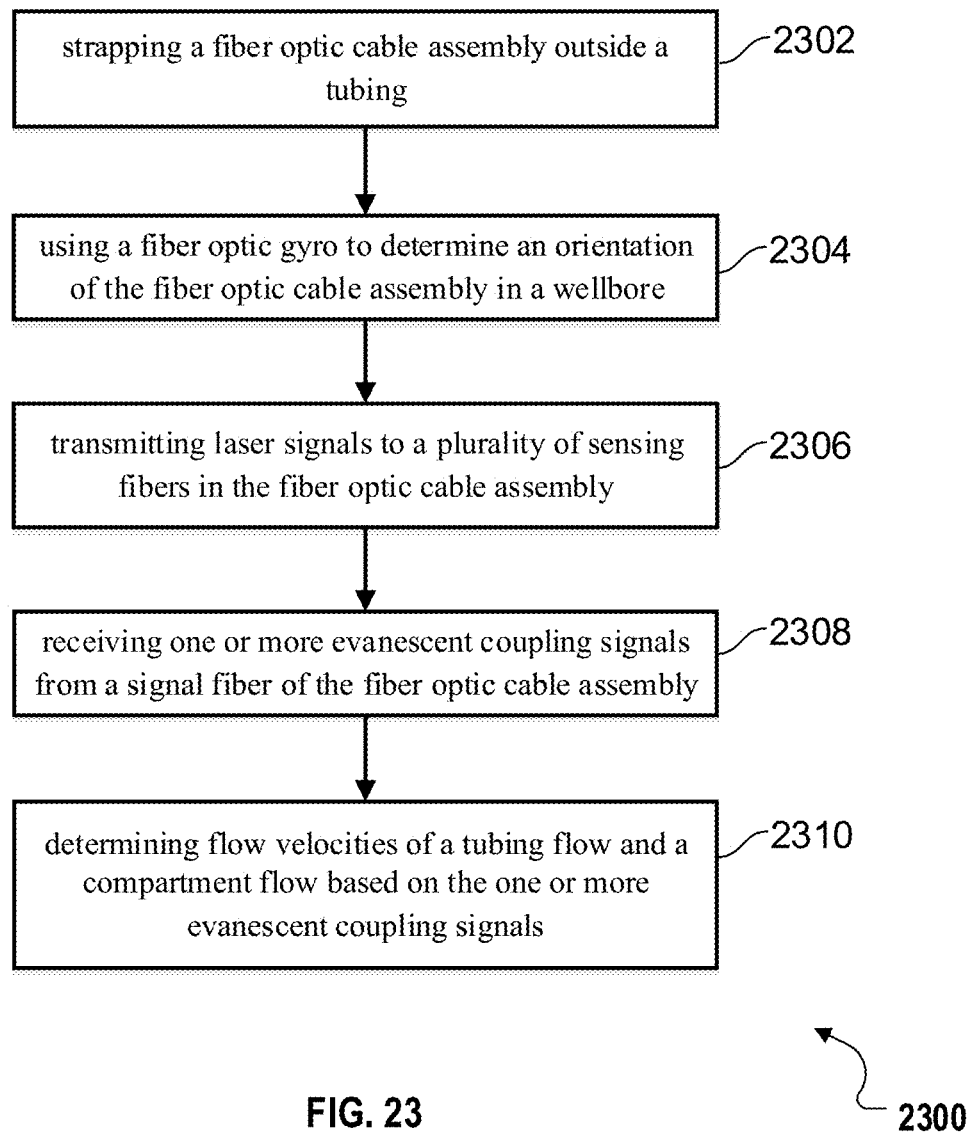
FIG. 23 illustrates a flowchart of an example method for isolating a compartment flow and a tubing flow using a second implementation of a directional sensitive fiber optic cable system, according to some implementations.

FIG. 23 illustrates a flowchart of an example method 2300 for isolating a compartment flow and a tubing flow using a second implementation of a directional sensitive fiber optic cable system, according to some implementations. Similar to the method 2200, the method 2300 can be used for the flow isolating described in FIGS. 18-19. At block 2302, a fiber optic cable assembly in FIG. 10 is strapped outside a tubing as shown in FIGS. 18-19. For example, the fiber optic cable assembly is strapped so that one isolated section is facing away from the tubing for monitoring the compartment flow and another isolated section is facing the tubing for monitoring the tubing flow. A fiber optic gyro is also wrapped around the outer surface of the tubing as shown in FIG. 17. The fiber optic cable assembly and the fiber optic gyro are lowered into the wellbore together with the tubing. At block 2304, the fiber optic gyro is connected to the laser box 1712. As described in FIG. 17, based on the transmitted and returned laser pulses, the fiber optic gyro determines an amount of tubing rotation that occurs when the tubing is running downhole, and therefore determine an orientation of the fiber optic cable system when the fiber optic cable system is settled in the wellbore.

At block 2306, the fiber optic cable assembly is connected to the laser box 804. As described in FIG. 8, the transmitter 808 transmits laser signals of different wavelengths to the sensing fibers in the fiber optic cable assembly. For example, laser signals of wavelengths $\lambda_1$ and $\lambda_2$ can be transmitted to the sensing fibers in the sections facing the tubing and facing the compartment, respectively. At block 2308, the receiver 810 receives evanescent coupling signals from the signal fiber in the fiber optic cable assembly. The laser box 804 and 1712 can be the same laser box, where the single laser box can first connect to the fiber optic gyro when the tubing is running downhole. Once the tubing is settled in the wellbore, the laser box is then switched to connect to the sensing fibers and the signal fiber. At block 2310, flow velocities of the tubing flow and the compartment flow are determined based on the received evanescent coupling signals. For example, as discussed earlier, based on the amplitude of the evanescent coupling signal of wavelength $\lambda_1$, the flow velocity of the tubing flow is determined based on the pressure sound level. Similarly, based on the amplitude of the evanescent coupling signal of wavelength $\lambda_2$, the flow velocity of the compartment flow is determined.

Described implementations of the subject matter can include one or more features, alone or in combination.

For example, in a first implementation, a fiber optic cable assembly, comprising: an elongate housing; a signal fiber placed inside the housing and extending longitudinally; and a plurality of sensing fibers placed inside the housing and extending longitudinally, wherein the plurality of sensing fibers are placed around the signal fiber, each of the plurality of sensing fibers carries a respective laser signal of a distinct frequency, and the signal fiber carries one or more evanescent coupling signals responsive to the laser signals in the plurality of sensing fibers.

The foregoing and other described implementations can each, optionally, include one or more of the following features:

A first feature, combinable with any of the following features, wherein the plurality of sensing fibers placed around the signal fiber includes the plurality of sensing fibers arranged in a circle with the signal fiber placed in the middle of the housing.

A second feature, combinable with any of the previous or following features, further comprising a high density fluid to keep the signal fiber and the plurality of sensing fibers in the housing immobilized.

A third feature, combinable with any of the previous or following features, further comprising: a plurality of mirrors dividing a space inside the housing into a plurality of isolated sections, each isolated section extending longitudinally, each isolated section including one of the plurality of sensing fibers.

A fourth feature, combinable with any of the previous or following features, wherein the housing has a circular cross-section.

A fifth feature, combinable with any of the previous or following features, further comprising: a transmitter transmitting the respective laser signals of the distinct frequencies into the plurality of sensing fibers; and a receiver receiving the one or more evanescent coupling signals in the signal fiber.

A sixth feature, combinable with any of the previous or following features, wherein a distance between the signal fiber and one of the plurality of sensing fibers changes with an environmental variation, and the change in the distance causes an evanescent coupling signal in the signal fiber corresponding to the laser signal in the one of the plurality of sensing fibers, and the evanescent coupling signal has a same frequency as the laser signal in the one of the plurality of sensing fibers.

A seventh feature, combinable with any of the previous or following features, wherein the environmental variation includes at least one of temperature, strain-stress, or pressure change around the fiber optic cable assembly.

An eighth feature, combinable with any of the previous or following features, wherein frequencies of the one or more evanescent coupling signals in the signal fiber are used to determine one or more directions associated with the environmental variation.

A ninth feature, combinable with any of the previous or following features, wherein a refraction index of one of the plurality of the sensing fibers changes with an environmental variation, and the change in the refraction index causes an evanescent coupling signal in the signal fiber corresponding to the laser signal in the one of the plurality of sensing fibers, and the evanescent coupling signal has a same frequency as the laser signal in the one of the plurality of sensing fibers.

A tenth feature, combinable with any of the previous or following features, further comprising a strap to secure the fiber optic cable assembly outside a tubing in a wellbore formed in a formation.

An eleventh feature, combinable with any of the previous or following features, further comprising: a fiber optic gyro including a first fiber and a second fiber wrapped on an outer surface of the tubing, the first fiber and the second fiber wrapped in opposite directions from each other, wherein the fiber optic gyro is used to determine an orientation of the fiber optic cable assembly after the tubing is settled in the wellbore.

In a second implementation, a method, comprising: transmitting laser signals to a plurality of sensing fibers in a fiber optic cable assembly, wherein each sensing fiber carries one laser signal, each laser signal has a distinct frequency, and the fiber optic cable assembly comprises: an elongate housing; and a signal fiber and the plurality of sensing fibers placed inside the housing and extending longitudinally, wherein the plurality of sensing fibers are placed around the signal fiber, the signal fiber carries one or more evanescent coupling signals responsive to the laser signals in the plurality of sensing fibers, and the fiber optic cable assembly is strapped outside a tubing in a wellbore formed in a formation; receiving, from the signal fiber of the fiber optic cable assembly, the one or more evanescent coupling signals; and based on the one or more evanescent coupling signals, determining flow velocities of first flowing media flowing through the tubing and second flowing media flowing through an annulus between the formation and the tubing.

The foregoing and other described implementations can each, optionally, include one or more of the following features:

A first feature, combinable with any of the following features, wherein the wellbore is a horizontal wellbore, and the method further comprising using a fiber optic gyro to determine an orientation of the fiber optic cable assembly in the wellbore.

A second feature, combinable with any of the previous or following features, wherein determining the flow velocities includes determining pressure levels of the first flowing media and the second flowing media based on amplitudes of the one or more evanescent coupling signals.

A third feature, combinable with any of the previous or following features, wherein a distance between the signal fiber and one of the plurality of sensing fibers changes with an environmental variation, and the change in the distance causes an evanescent coupling signal in the signal fiber corresponding to the laser signal in the one of the plurality of sensing fibers, and the evanescent coupling signal has a same frequency as the laser signal in the one of the plurality of sensing fibers.

A fourth feature, combinable with any of the previous or following features, wherein the environmental variation includes at least one of temperature, strain-stress, or pressure change around the fiber optic cable assembly.

A fifth feature, combinable with any of the previous or following features, wherein a refraction index of one of the plurality of the sensing fibers changes with an environmental variation, and the change in the refraction index causes an evanescent coupling signal in the signal fiber corresponding to the laser signal in the one of the plurality of sensing fibers, and the evanescent coupling signal has a same frequency as the laser signal in the one of the plurality of sensing fibers.

In a third implementation, a method, comprising: transmitting laser signals to a plurality of sensing fibers in a fiber optic cable assembly, wherein each sensing fiber carries one laser signal, each laser signal has a distinct frequency, and the fiber optic cable assembly comprises: an elongate housing; and a signal fiber and the plurality of sensing fibers placed inside the housing and extending longitudinally, wherein the plurality of sensing fibers are placed around the signal fiber, the signal fiber carries one or more evanescent coupling signals responsive to the laser signals in the plurality of sensing fibers, and the fiber optic cable assembly is strapped outside a tubing in a wellbore formed in a formation; receiving, from the signal fiber of the fiber optic cable assembly, the one or more evanescent coupling signals; and based on the one or more evanescent coupling signals, determining characteristics of a down-going seismic signal and an up-going seismic signal.

A first feature, combinable with any of the following features, wherein determining the characteristics of the down-going seismic signal and the up-going seismic signal includes determining pressure levels of the down-going seismic signal and the up-going seismic signal based on amplitudes of the one or more evanescent coupling signals.

Thus, particular implementations of the subject matter have been described. Other implementations are within the scope of the following claims.

The invention claimed is:

1. A method, comprising:
   transmitting laser signals to a plurality of sensing fibers in a fiber optic cable assembly, wherein each sensing fiber carries one laser signal, each laser signal has a distinct frequency, and the fiber optic cable assembly comprises:
   an elongate housing; and
   a signal fiber and the plurality of sensing fibers placed inside the housing and extending longitudinally, wherein the plurality of sensing fibers are placed around the signal fiber, the signal fiber carries one or more evanescent coupling signals responsive to the laser signals in the plurality of sensing fibers, and the fiber optic cable assembly is strapped outside a tubing in a wellbore formed in a formation;
   receiving, from the signal fiber of the fiber optic cable assembly, the one or more evanescent coupling signals; and
   based on the one or more evanescent coupling signals, determining flow velocities of first flowing media flowing through the tubing and second flowing media flowing through an annulus between the formation and the tubing.

2. The method of claim 1, wherein the wellbore is a horizontal wellbore, and the method further comprising using a fiber optic gyro to determine an orientation of the fiber optic cable assembly in the wellbore.

3. The method of claim 1, wherein determining the flow velocities includes determining pressure levels of the first flowing media and the second flowing media based on amplitudes of the one or more evanescent coupling signals.

4. The method of claim 1, wherein a distance between the signal fiber and one of the plurality of sensing fibers changes with an environmental variation, and the change in the distance causes an evanescent coupling signal in the signal fiber corresponding to the laser signal in the one of the plurality of sensing fibers, and the evanescent coupling signal has a same frequency as the laser signal in the one of the plurality of sensing fibers.

5. The method of claim 1, wherein the environmental variation includes at least one of temperature, strain-stress, or pressure change around the fiber optic cable assembly.

6. The method of claim 1, wherein a refraction index of one of the plurality of the sensing fibers changes with an environmental variation, and the change in the refraction index causes an evanescent coupling signal in the signal fiber corresponding to the laser signal in the one of the plurality of sensing fibers, and the evanescent coupling signal has a same frequency as the laser signal in the one of the plurality of sensing fibers.

* * * * *